(12) United States Patent
Beransky et al.

(10) Patent No.: US 10,618,751 B2
(45) Date of Patent: Apr. 14, 2020

(54) MODULAR LOADING AND UNLOADING SYSTEM AND PROCESS

(71) Applicant: Amada America, Inc., Buena Park, CA (US)

(72) Inventors: Michael Beransky, Irvine, CA (US);
Mihai Cioclei, Chino Hills, CA (US);
Alexey Volovik, Anaheim, CA (US);
Jonas Gutierrez, Whittier, CA (US);
Fred Cortez, Downey, CA (US);
Karapet Kirishchyan, Chino, CA (US)

(73) Assignee: Amada America, Inc., Buena Park, CA (US)

( * ) Notice: Subject to any disclaimer, the term of this patent is extended or adjusted under 35 U.S.C. 154(b) by 0 days.

(21) Appl. No.: 16/435,346

(22) Filed: Jun. 7, 2019

(65) Prior Publication Data

US 2019/0291978 A1   Sep. 26, 2019

Related U.S. Application Data

(63) Continuation-in-part of application No. 15/299,136, filed on Oct. 20, 2016, now abandoned.

(51) Int. Cl.
| B65G 65/00 | (2006.01) |
| B65G 1/02 | (2006.01) |
| B23K 26/08 | (2014.01) |
| B65G 57/24 | (2006.01) |

(52) U.S. Cl.
CPC .......... *B65G 65/005* (2013.01); *B23K 26/083* (2013.01); *B65G 1/026* (2013.01); *B65G 57/24* (2013.01); *B65G 2201/022* (2013.01)

(58) Field of Classification Search
CPC .... B23K 26/38; B23K 26/702; B23K 26/083;
G05B 19/0421; G05B 2219/23389; B23Q 7/14; B23Q 7/1405; B23Q 7/141; B23Q 7/1447; B23Q 7/005; B23Q 15/00; B23Q 41/00; B65G 1/026; B65G 2201/022; B65G 57/24; B65G 65/005
USPC ...................................................... 219/121.82
See application file for complete search history.

(56) References Cited

U.S. PATENT DOCUMENTS

| 8,145,350 B2 | 3/2012 | Lancaster, III et al. |
| 2007/0162174 A1* | 7/2007 | Doke ..................... B25J 9/0093 700/117 |
| 2009/0255911 A1* | 10/2009 | Krishnaswami ..... B23K 26/067 219/121.69 |
| 2011/0061889 A1 | 3/2011 | King |
| 2013/0046402 A1 | 2/2013 | Kodama et al. |
| 2013/0306811 A1* | 11/2013 | Iwaki ..................... F16M 13/02 248/205.1 |

(Continued)

OTHER PUBLICATIONS

Logitech (NPL—Logitech Advanced 2.4 GHZ Technology, Mar. 2, 2009).

*Primary Examiner* — Dana Ross
*Assistant Examiner* — James F Sims, III
(74) *Attorney, Agent, or Firm* — Cionca IP Law P.C.; Marin Cionca

(57) ABSTRACT

A modular loading and unloading system wherein modular units can be simply added to a base unit, or main unit, in a desired configuration that fulfill capacity and footprint needs of a manufacturer at any moment, for example when the manufacturer's business expands, thus considerably reducing the time and cost of modifying existing manufacturing systems, such as a laser-based parts cutting system.

17 Claims, 24 Drawing Sheets

(56) References Cited

U.S. PATENT DOCUMENTS

| | | |
|---|---|---|
| 2013/0331035 A1 | 12/2013 | Wu |
| 2014/0190950 A1 | 7/2014 | Falcone |
| 2015/0375882 A1* | 12/2015 | Wetsch .................... B65B 3/04 53/284.7 |
| 2016/0175970 A1 | 6/2016 | Denis |
| 2018/0067464 A1* | 3/2018 | Budge ................... B33Y 50/02 |

* cited by examiner

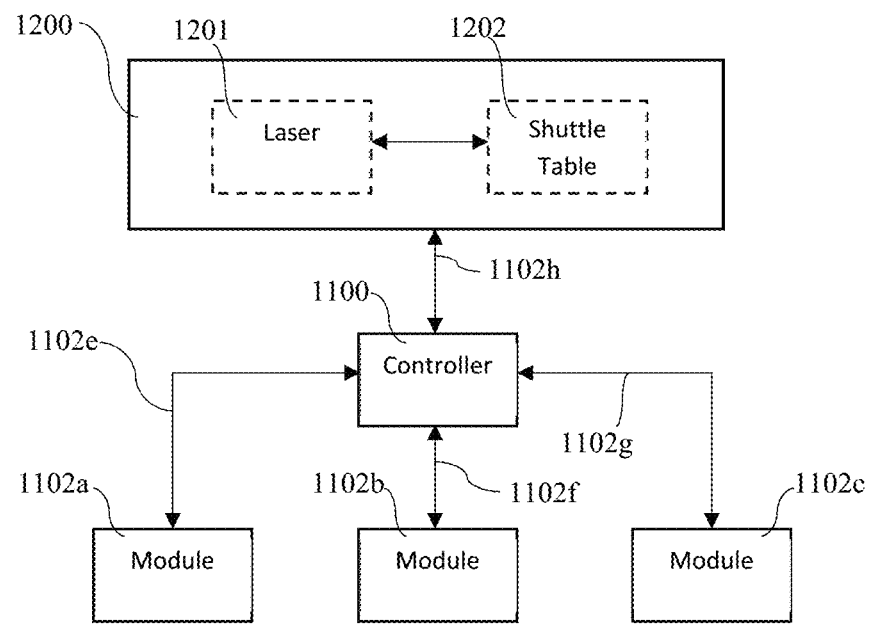
FIG. 1
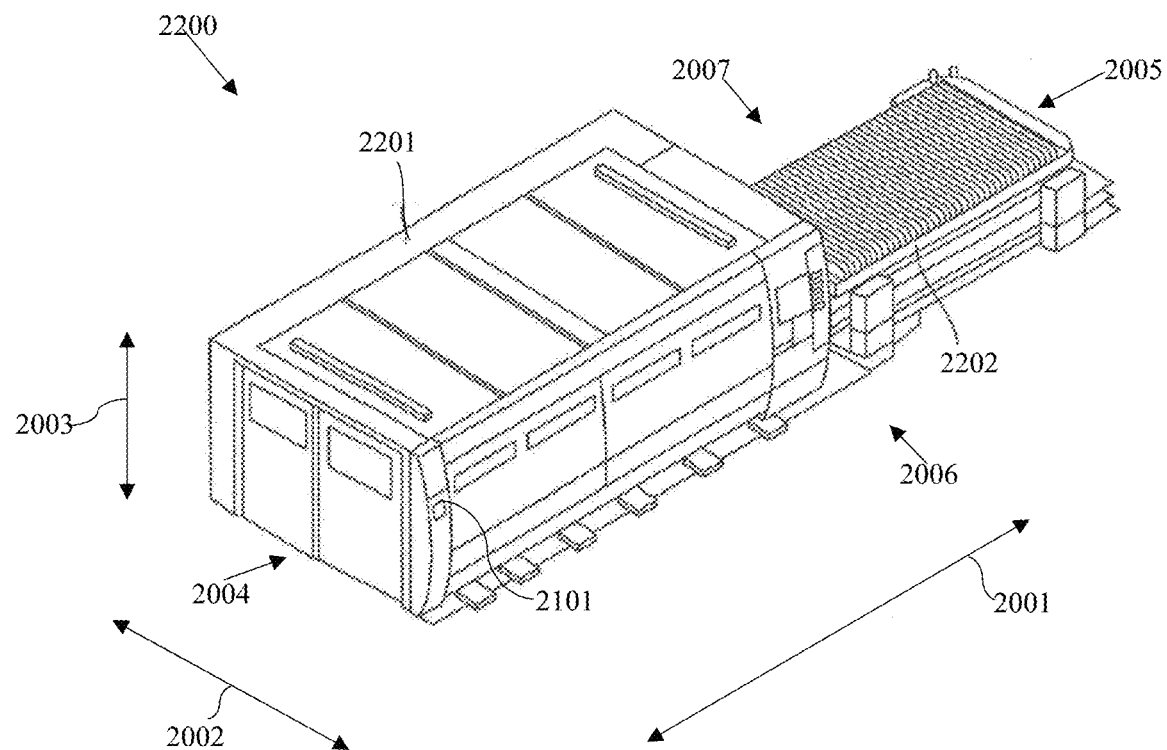
FIG. 2 – Prior Art

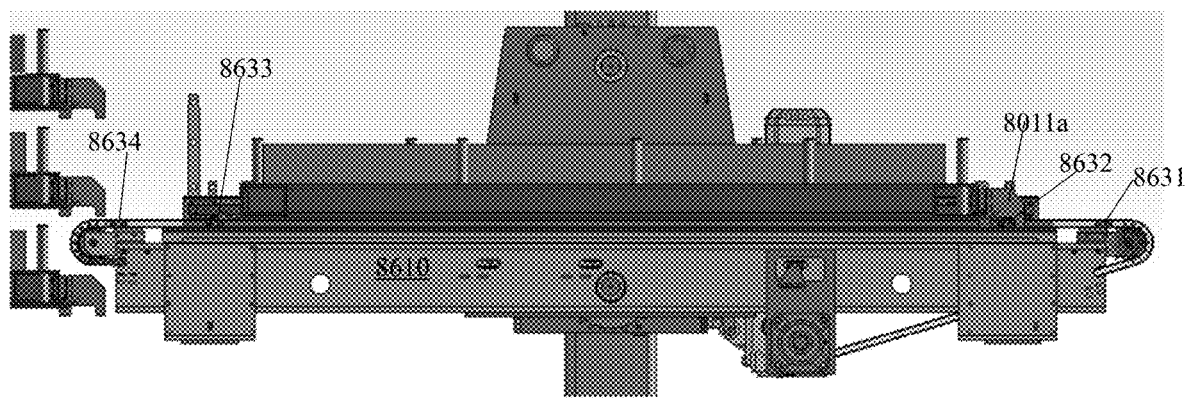
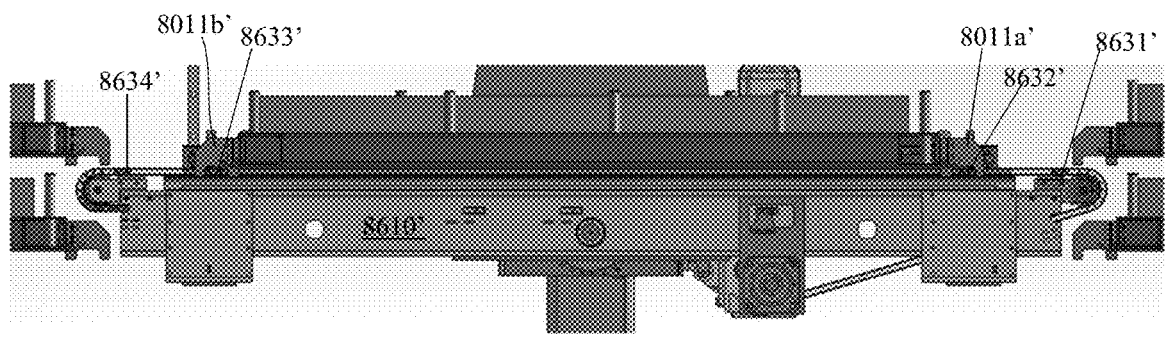
FIG. 8e

MODULAR LOADING AND UNLOADING SYSTEM AND PROCESS

CROSS-REFERENCE TO RELATED APPLICATIONS

This application is a continuation-in-part and claims the benefit of U.S. Non-Provisional application Ser. No. 15/299,136, filed Oct. 20, 2016, which is hereby incorporated by reference, to the extent that it is not conflicting with the present application.

BACKGROUND OF INVENTION

1. Field of the Invention

The invention relates generally to loading and unloading systems and processes and more particularly to modular loading and unloading systems and processes that can be incorporated into most parts processing systems and spaces.

2. Description of the Related Art

Loading and unloading systems for providing support for a particular application, such as laser-based parts cutting, are generally constructed of a variety of components. Typically, various pieces of materials need to be cut to size and welded together to form one or more frame sections. The process of forming a frame section is labor intensive and, once assembled, typically still requires machine work (drilling, etc.) in order to associate the frames with each other or with the application system they are supposed to support. Once the complete frame structure of the supporting loading and unloading system is built for a specific application, there is little flexibility to its design in order to allow for example changes in its configuration (e.g., width, length, footprint, etc.) or capacity.

There is a need for a system and method to rapidly, easily and inexpensively modify/customize existing manufacturing systems (e.g., part processing systems), particularly their loading and unloading system, and that can be easily transported and quickly and easily assembled/disassembled and/or reconfigured, whether it be on same site or a different site in the same facility, or, in a more remote location in the field.

Often, manufacturers need to expand their operations, such as when receiving larger orders or when acquiring additional customers. Sometimes, a manufacturer may need to move to a different facility or may need to modify the footprint of an existing facility to for example accommodate business expansion. In all of these exemplary circumstances, the manufacturer needs to rapidly and economically expand its manufacturing capacity in a way that is suitable for the footprint available to it at the particular moment. While some techniques for modifying the width and length of a manufacturing system (e.g., parts cutting system) may be known, time consuming and expensive mechanical intervention still appears to be required to either separate joined components or to assemble separate components to form an integral manufacturing system. Further, the configuration versatility of such systems and techniques appears to be limited.

What is desired is to provide a modular system wherein modular units can be simply added to a base unit, or main unit, in a desired configuration that fulfill capacity and footprint needs of the manufacturer at any moment, for example when the manufacturer's business expands, thus considerably reducing the time and cost of modifying existing manufacturing systems, such as a laser-based parts cutting system.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a system and method is provided to rapidly, easily and inexpensively modify/customize existing manufacturing systems (e.g., part processing systems), particularly their loading and unloading system, and that can be easily transported and quickly and easily assembled/disassembled and/or reconfigured, whether it be on same site or a different site in the same facility, or, in a more remote location in the field.

In another aspect, a modular loading and unloading system is provided wherein modular units can be simply added to a base unit, or main unit, in a desired configuration that fulfill capacity and footprint needs of the manufacturer at any moment, for example when the manufacturer's business expands, thus considerably reducing the time and cost of modifying existing manufacturing systems, such as a laser-based parts cutting system.

In another aspect, a novel technique for adding modules to a computer (controller) controlled existing shuttle-based system is provided, such as a laser material cutting system. The modular add-on is configured to communicate with the controller so that when the module is connected to the controller, it is recognized by the controller and allows a human operator to input various commands to adjust the parameters of the combined system so that it operates as desired. Thus, the disclosed system enables a user the flexibility of adding a module to the basic system, which is automatically recognized; automatic recognition of the added module being accomplished by having the controller detect a unique I/O address on the module. Subsequent to detection, a message appears on the controller screen, the operator then having the option of selecting a default configuration of the added module or a customized one.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1 illustrates a simplified block diagram of a Modular Loading and Unloading System ("MLUS").

FIG. 2 illustrates a perspective view of an exemplary base module, known in the art.

FIGS. 8a-8i illustrate an exemplary method a crane module may use to retrieve materials from and deposit materials onto a top tower module, according to an aspect.

DETAILED DESCRIPTION

Figure 3A:
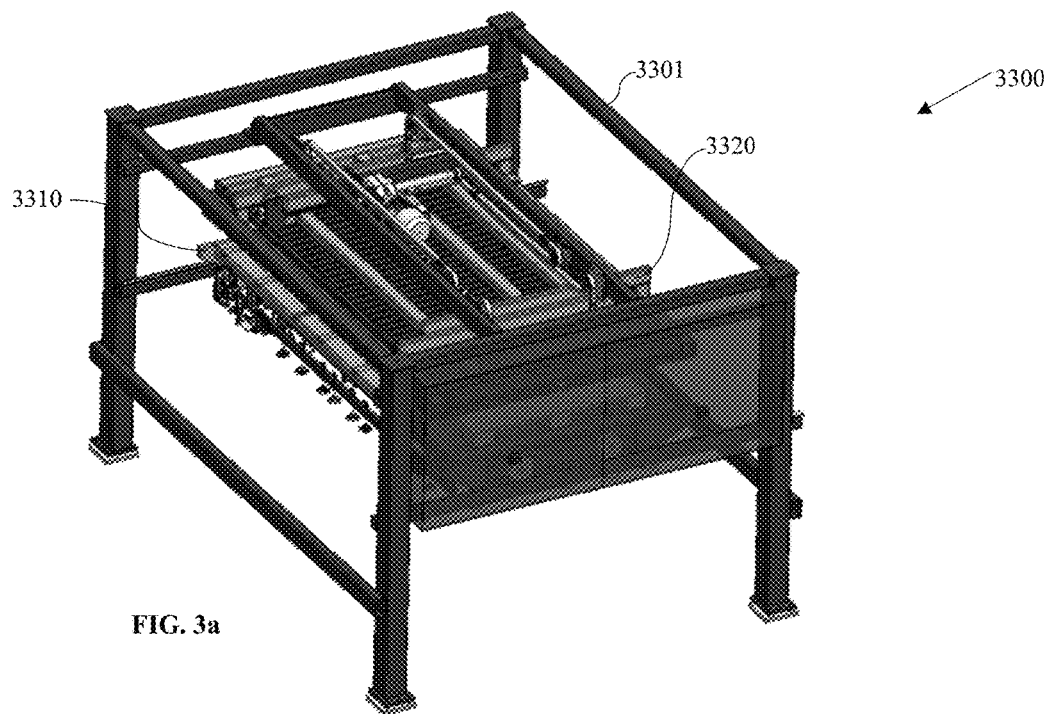
FIG. 3a illustrates a perspective view of a master module ("master"), according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art (e.g., network wiring).

For the following description, it can be assumed that most correspondingly labeled elements across the figures (e.g., 1200 and 2200, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a simplified block diagram of a Modular Loading and Unloading System ("MLUS"). As shown in FIG. 1, an MLUS may comprise a controller 1100 connected to a plurality of modules 1200 and 1102a-c. A controller 1100 may have logic or may be a computer programmed to, for example, recognize individual modules, record custom or default parameters associated with individual modules, and network together a plurality of modules, and perform other operations as described herein. As an example, the controller 1100 may be a PLC (Programmable Logic Controller) that can be programmed to perform the functions described herein, by using appropriate software (e.g., Omron™ Sysmac Studio).

A function of the controller 1100 may be to instruct the formed network of modules how and when to operate, as detailed hereinafter, such that said modules work together smoothly and efficiently to load or unload, and/or process materials, as disclosed in greater detail hereinbelow. One of the modules connected to the controller 1100 may be a base module ("base") 1200. As an example, a base 1200 may be the first module connected to the controller 1100, and, additional modules, such as 1102a-c, may be added to improve the configuration (e.g., spatial configuration), capacity and/or efficiency of loading and unloading materials to and from the base module 1200, as it will described in detail hereinafter.

It should be noted that the controller 1100 may be programmed with all anticipated network configurations (e.g., network nodes, node address, module name, module placement options (e.g., left, right), etc.) of an MLUS. The controller 1100 may also be programmed with the ability to recognize which module is being connected to it via for example a node address specific to the module, as disclosed in more detail hereinafter, when for example referring to FIGS. 12-13.

Figure 9A:
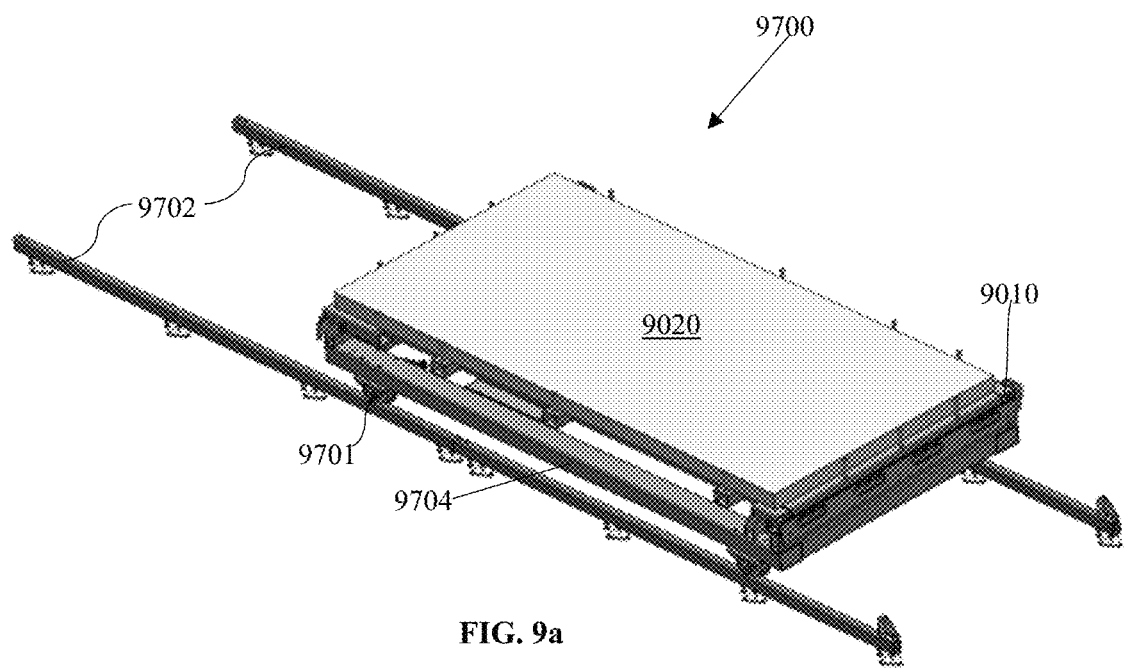
FIGS. 9a-9b illustrate perspective views of exemplary embodiments of a staging cart module ("staging cart"), according to an aspect.

As an example, the base module 1200 may be a laser machine ("laser") 1201 with a shuttle table 1202. The laser machine 1201 is an example of material sheet processing machines that may be used for example to cut raw materials of varying sizes and the shuttle table 1202 may transport raw materials into and cut materials out of the laser machine 1201, as is known in the art. As an example, raw materials may be stacks of sheet metal of various sizes and thicknesses. For example, as it will be apparent from the ensuing description, the additional modules 1102a-c may be for example a master module (such as 3300 of FIG. 3a) to help load and unload materials more quickly, a crane (such as 7600 of FIG. 7b) to allow a user to more quickly and easily provide module 3300 with raw materials from additional locations, or, a staging cart 9700 (FIG. 9a).

In an example, the controller 1100 may be incorporated into the module 3300 (master module) and all additional modules with moving parts will be controlled by the controller 1100 ("master controller"). The moving parts of the additional modules may have their own controllers ("slave controllers"; e.g., motor controllers) that will be controlled by the master controller 1100.

It should be understood that, the modules disclosed herein that have moving parts that need to be controlled by the controller 1100, in order for the MLUS system to work properly, may be wirelessly or physically connected via communication links 1102e-h (e.g., Ethernet cables for physical data connection) to controller 1100, such that the controller may receive data from and send data to said modules. As an example, the controller may receive data from a module regarding its node address and/or the status of the module. Additionally, the data sent by the controller 1100 to a module may be commands for a module to begin or stop a process, for example.

As stated hereinbefore, applying a Modular Loading and Unloading System to machine processes, such as laser cutting, can improve the efficiency of the processes and better utilize a user's space. More particularly, an MLUS may make loading and unloading processes faster and easier in addition to allowing companies to choose modules and machines layouts to fit their space and production capacity needs at a particular moment and easily customize such layout or configurations as the needs change.

FIG. 2 illustrates a perspective view of an exemplary base module 2200, namely a laser cutting machine, known in the art.

As an example, the modules of an MLUS may have four sides and move along three axes. The four sides may be the front side ("front") 2004, back side ("back") 2005, left side ("left") 2006, and right side ("right") 2007, as shown in FIG. 2. The axes of movement may be latitudinal 2001, longitudinal 2002, and vertical 2003.

As mentioned hereinbefore when referring to FIG. 1, a base module 2200 may be a laser machine 2201 with a shuttle table 2202. As shown in FIG. 2, the shuttle table 2202 may be located at the back of the laser machine 2201. There may be a graphical user interface ("GUI") 2101 near the front on the left side of the laser machine 2201, to allow an operator to interface with a laser machine controller (not shown).

It should also be noted that the shuttle table 2202 may be equipped with sensors (not shown) to ensure only one piece of raw material is present on the table 2202 before transporting the it into the laser machine 2201 for cutting. As an example, the sensors may be laser sensors known in the art. If the sensors detect more than one piece of raw material on the shuttle table, then the controller may alert a user to fix the problem, by sending an alert to the GUI 2101, for example.

FIG. 3a illustrates a perspective view of a master module ("master") 3300, according to an aspect. A master module 3300 may be used to transfer raw materials onto a shuttle table 2202 and transfer cut materials off of same shuttle table. These operations may be performed by a loading element 3310 ("loading unit") and an unloading element 3320 ("unloading unit"), respectively. The frame 3301 of a master 3300 may be mounted around a shuttle table 2202, such that the loading element 3310 and unloading element 3320 can lower down directly to the shuttle table 2202, as disclosed in greater detail when referring to FIGS. 3c and 5a-d.

Figure 3B:
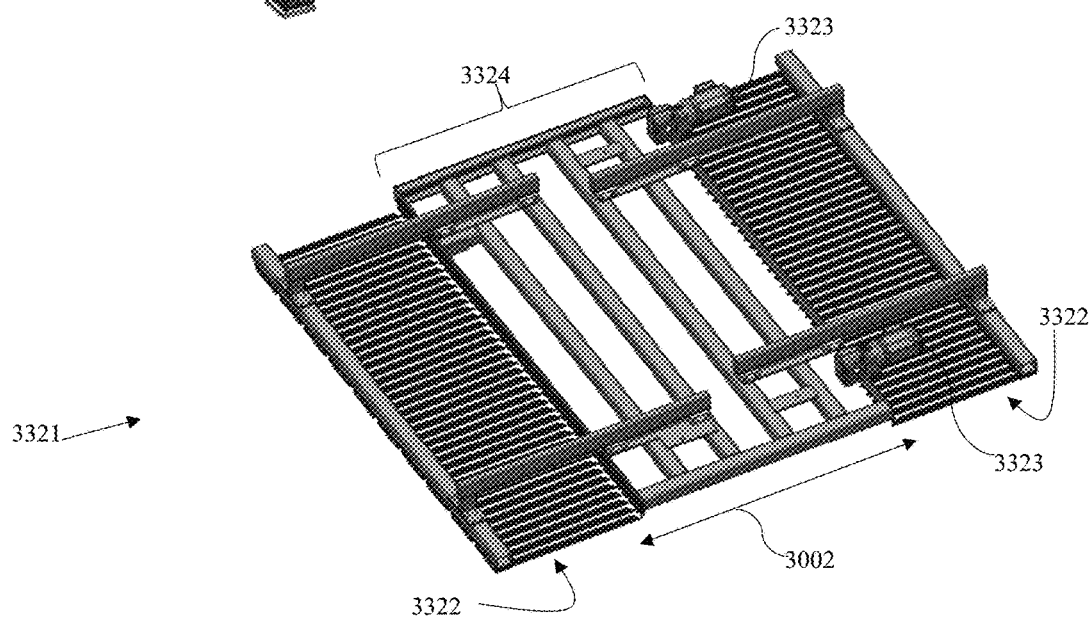
FIG. 3b illustrates a perspective view of a fork component in an open state, according to an aspect.

FIG. 3b illustrates a perspective view of a fork 3321 component in an open state, according to an aspect. The purpose of a fork 3321 may be to collect cut materials from a shuttle table, such that the cut materials can be placed on a wooden pallet 3023 (FIG. 3c) and transferred to another location for easier pick up. As an example, cut materials may be collected by using motors 3323 to slide open the teeth 3322 of a fork 3321 longitudinally 3002. Once the fork 3321 is in open state, as shown by FIG. 3b, the unloading element may lower down to the shuttle table 2202 and the motors 3323 may close the teeth 3322 below the cut materials, thus the cut materials will rest upon the teeth 3322 when the unloading element is lifted. To prevent cut materials from sliding off of the 3322 teeth or getting stuck as the unloading element moves, a fork 3321 may be equipped with barriers 3324 around the sides and on top of the teeth 3322 to contain the cut materials. The barriers 3324 may also prevent cut materials from tilting and slipping between the teeth 3322. The unloading process and unloading element components are disclosed in greater detail when referring to FIGS. 3c and 5a-d.

Figure 3C:
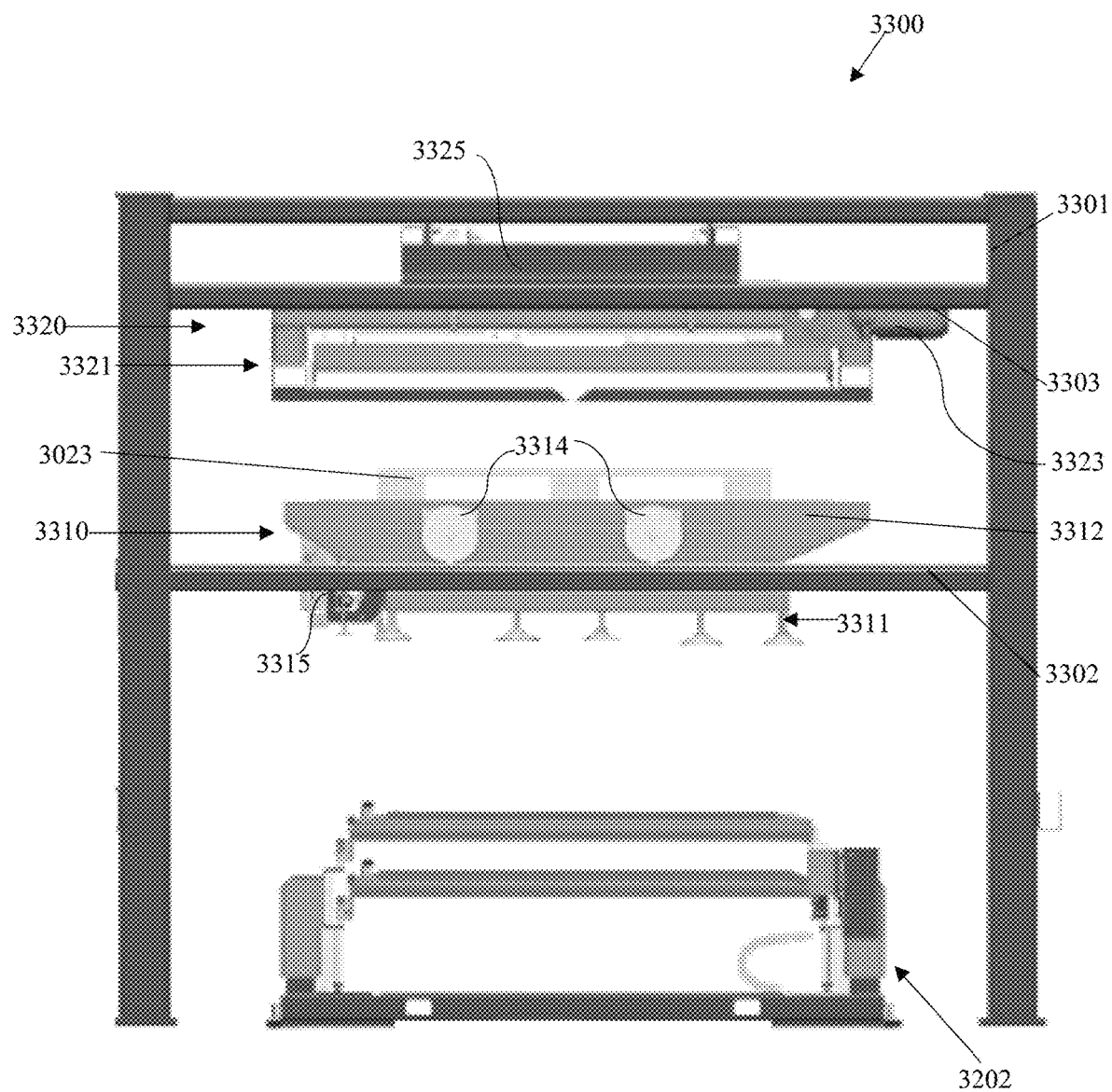
FIG. 3c illustrates a back elevation view of a master module with its frame mounted around a shuttle table, according to an aspect.

FIG. 3c illustrates a back elevation view of a master module 3300 with its frame 3301 mounted around a shuttle table 3202, according to an aspect. As disclosed hereinabove, a master module 3300 may have a loading element 3310 and an unloading element 3320 which may each rest upon a set of rails: the loading element rails ("loading rails") 3302 and unloading element rails ("unloading rails") 3303, respectively. The loading rails 3302 and unloading rails 3303 may be attached to the frame 3301, as shown.

A loading element 3310 may be used to deposit raw material onto a shuttle table 3202. Suction cups 3311 may be used to retrieve a piece of raw material and wheels 3314 may be attached to the front and back sides of a finished parts tray 3312, as shown. Wheels 3314 may allow a loading element 3310 to roll longitudinally, as disclosed herein when referring to FIGS. 5a-d. As an example, a motor 3315 may be used to power a lift (not shown) for lowering and lifting the suction cups 3311, the suction cups 3311, and the wheels 3314 of the loading element 3310. As another example, there may be two motors: one motor to power the lift (not shown) and suction cups 3311, and a second motor 3315 to power the wheels 3314.

An unloading element 3320 may use a fork 3321 to collect cut materials from the shuttle table 3202 and deposit those material onto a wooden pallet 3023, for example. As with the loading element 3310, the unloading element 3320 may be equipped with one motor (not shown) to power and activate the elevator 3325 and two additional motors (3323 of FIG. 3b) to power and activate the fork (3321 of FIG. 3b).

It should be noted that the loading and unloading processes will be disclosed in greater detail when referring to FIGS. 5a-d. Additionally, it should be understood that the master module 3300 may be communicatively connected to the controller 1100, as disclosed when referring to FIG. 1, such that the controller 1100 may send data to and receive data from the master module 3300, to accomplish the functions disclosed herein. More particularly, the controller 1100 may receive information from the master module 3300 (e.g., by receiving data from various motor controllers and/or sensors (not shown)) regarding its status and the controller 1100 may send commands to the master module 3300 to perform tasks at specific times (e.g., by sending commands to drivers of motors 3323), for example. Information regarding the status of the master module 3300 may be the location and position of the loading 3310 and unloading 3320 elements, whether or not the loading 3310 and unloading 3320 elements are holding material, and so on. As an example, the tasks the controller 1100 may ask the master module 3300 to perform may be to synchronize the loading and unloading of materials, as described when referring to FIGS. 5a-d.

Figure 4A:
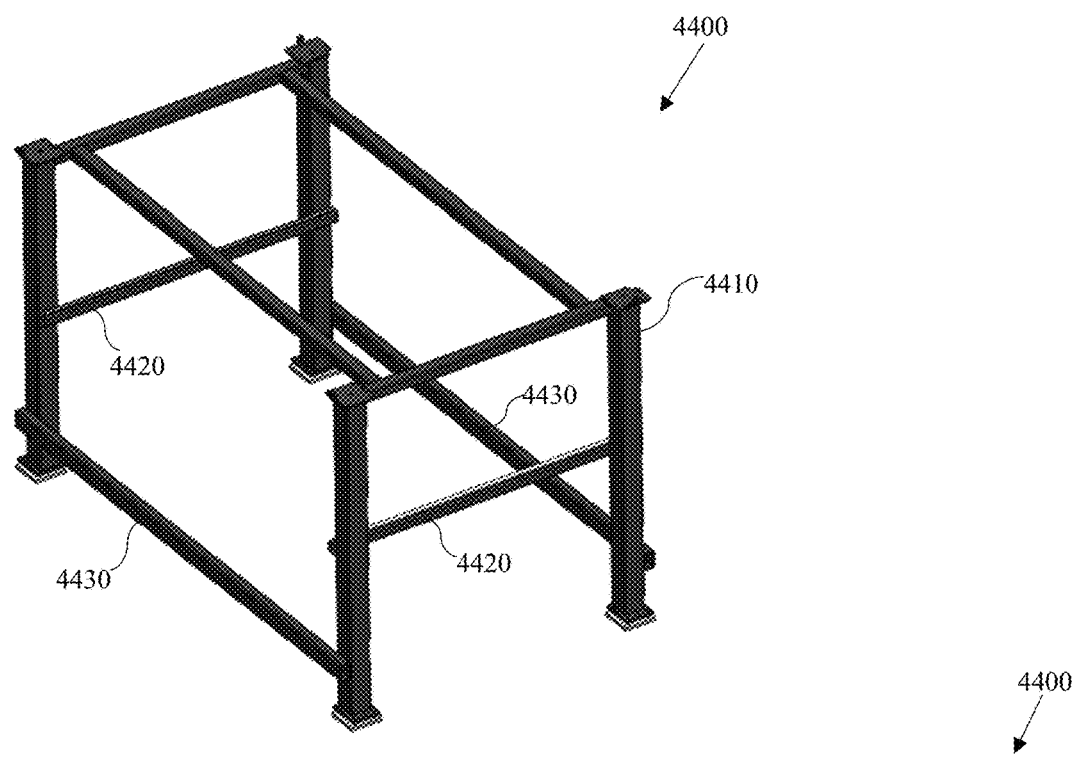
FIG. 4a illustrates a perspective view of a slave module ("slave"), according to an aspect.
Figure 4B:
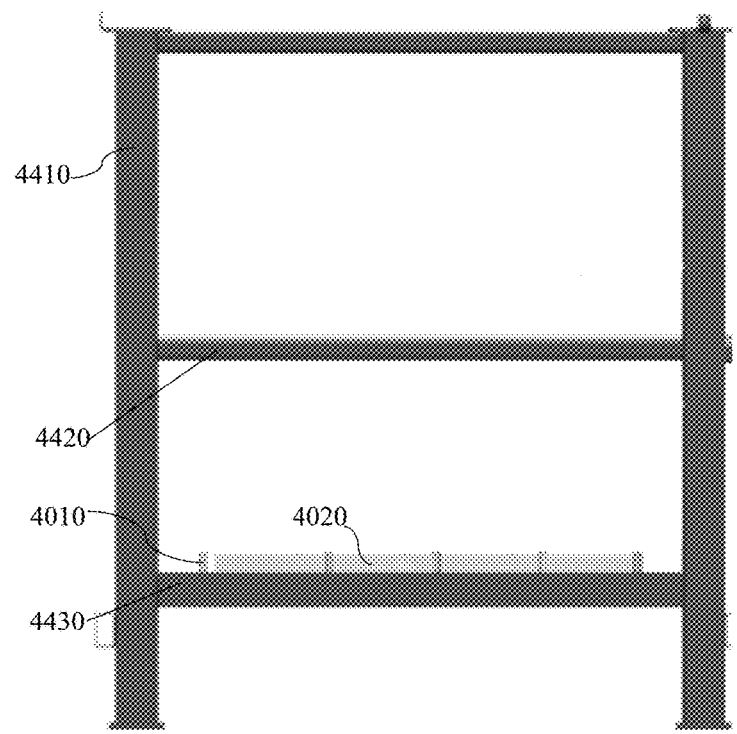
FIG. 4b illustrates a back elevation view of a slave module 4400, according to an aspect.

FIG. 4a illustrates a perspective view of a slave module ("slave") 4400 and FIG. 4b illustrates a back elevation view of a slave module 4400, according to an aspect. As shown in FIG. 4a, a slave module 4400 may have a frame 4410, loading element rails ("loading rails") 4420, and material pallet supports ("material supports," "pallet supports") 4430, for example. As another example, a slave module 4400 may have a staging cart (9700 of FIGS. 9a-b) in place of material pallet supports 4430, as disclosed in greater detail hereinafter when referring to FIGS. 9a-b.

The loading element rails 4420 preferably align with the loading element rails (3302 of FIGS. 3a-c) of the master module (3300 of FIGS. 3a-c), such that the loading element (3310 of FIGS. 3a-c) may roll smoothly longitudinally from the loading element rails of the master module to the loading rails 4420 of the slave module and vice versa.

The material pallet supports 4430 may be attached to the frame 4410 below the loading element rails 4420. As shown in FIG. 4b, a material pallet 4010 with a stack of raw materials 4020 may be placed atop the material pallet supports 4430. The purpose of the material pallet supports 4430 may be to provide a convenient location for the loading element 3310 of a master module 3300 to pick up raw material 4020, for example.

Figure 6A:
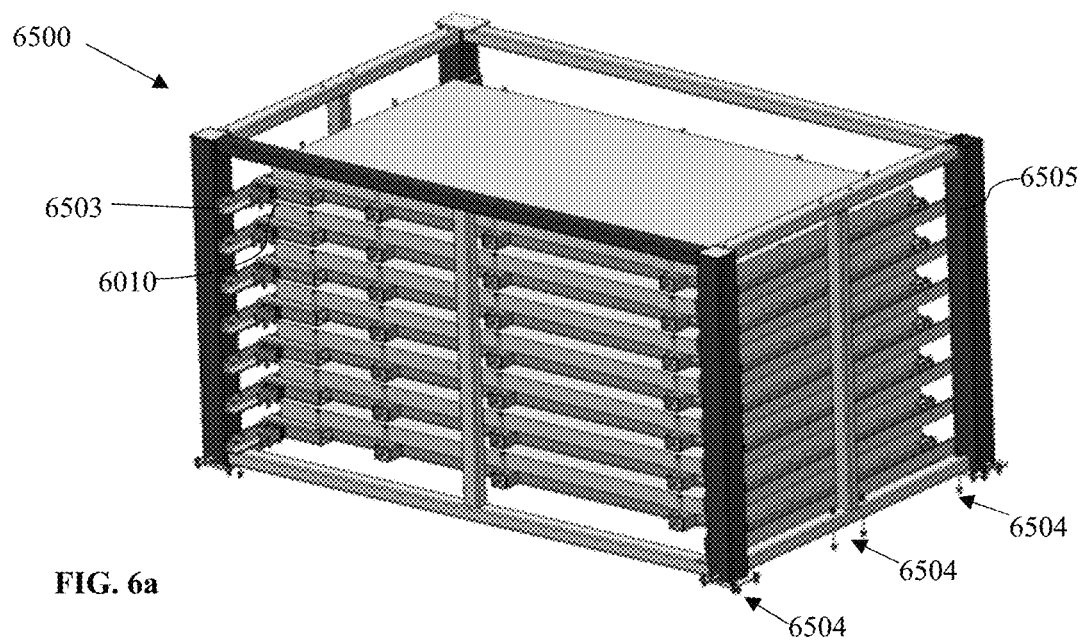
FIG. 6a illustrates a perspective view of a top tower module ("top tower"), according to an aspect.
Figure 6B:
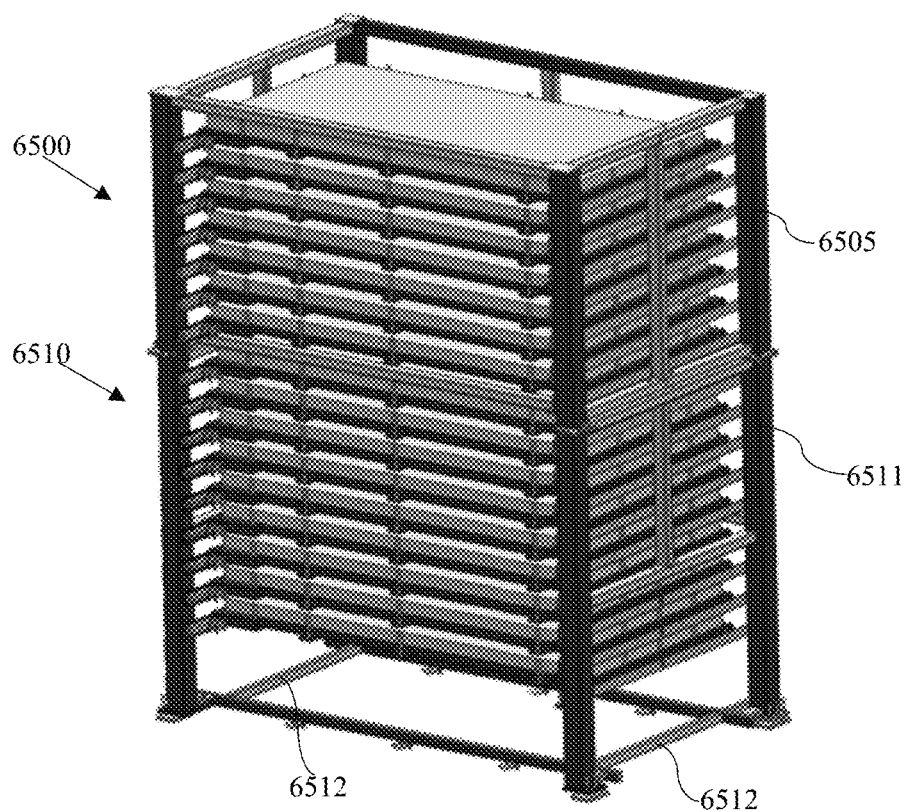
FIG. 6b illustrates a perspective view of a top tower module mounted atop a bottom tower module ("bottom tower"), according to an aspect.
Figure 6C:
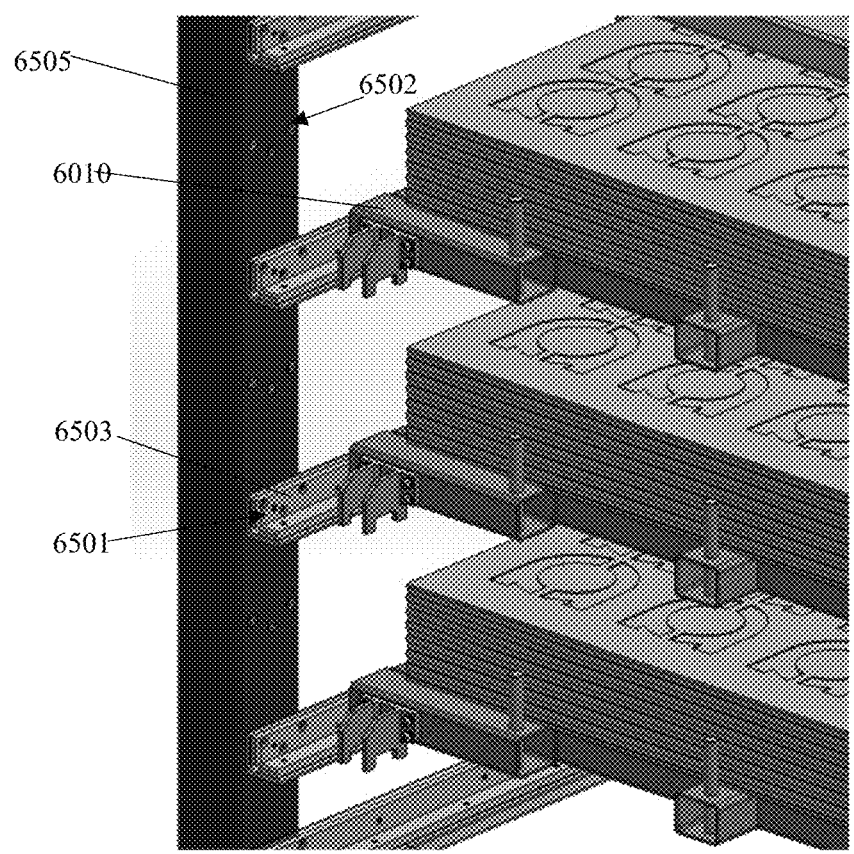
FIG. 6c illustrates a detailed close-up view of an exemplary method which may be used to customize the pallet shelves of a top tower, according to an aspect.
Figure 7A:
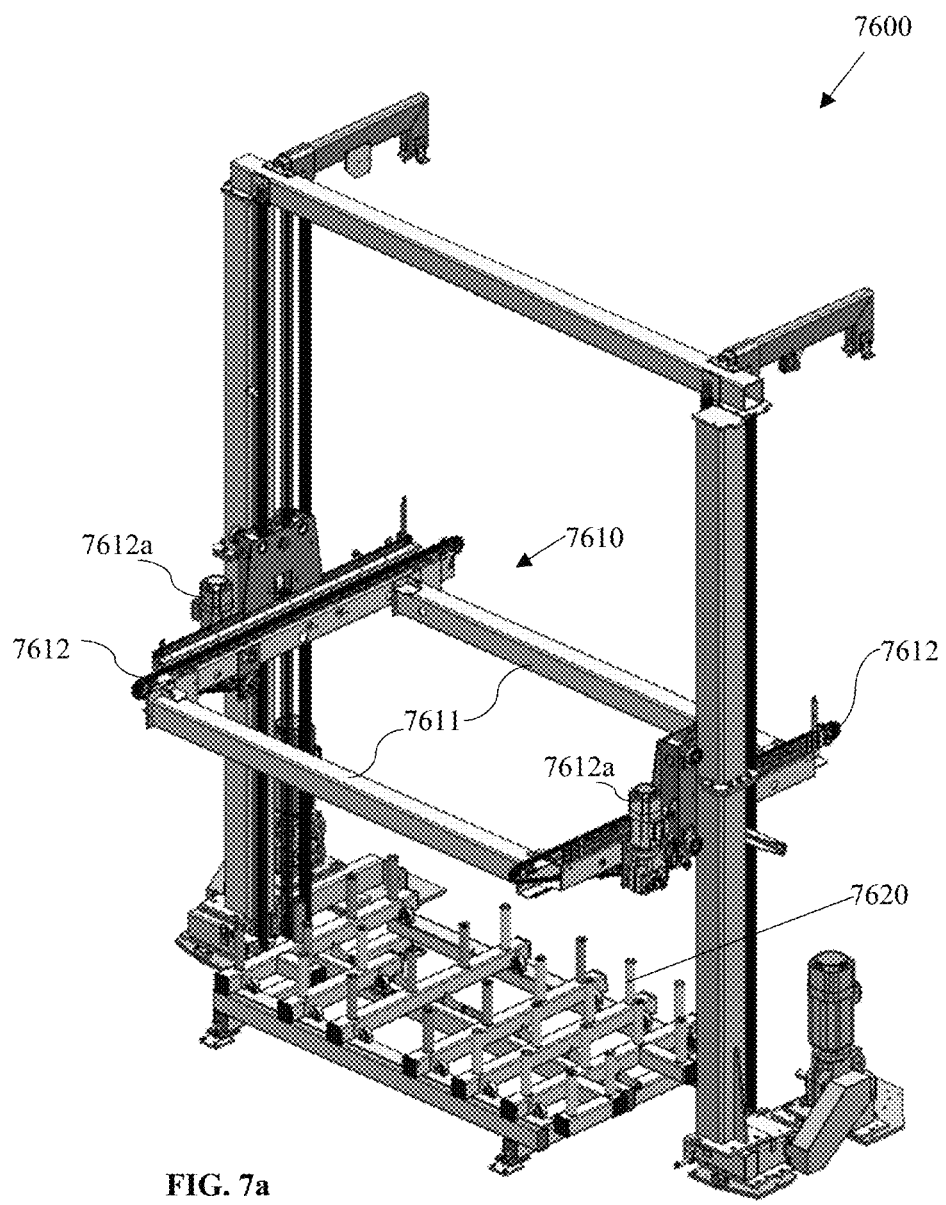
FIG. 7a illustrates a perspective view of a crane module ("crane"), according to an aspect.
Figure 7B:
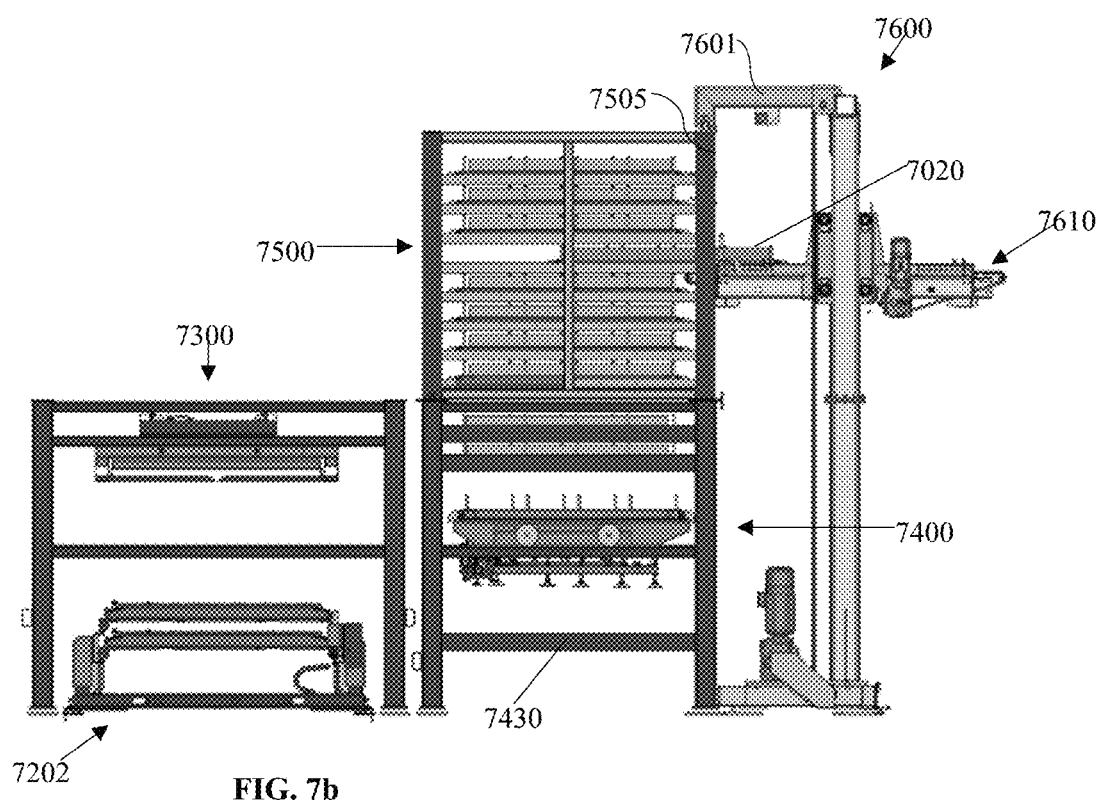
FIGS. 7b-7c illustrate a back elevation views of a crane module transporting materials from a top tower module to a slave module, according to an aspect.

It should be noted that it is possible to add pallet shelves, as shown in FIGS. 7a-b, to provide additional storage. Pallet shelve may be added to the slave module 4400 in a manner similar to the method used to add shelves to a top tower (6500 of FIGS. 6a-b) or bottom tower (6510 of FIG. 6b) module, as disclosed when referring to FIG. 6c.

Figure 5A:
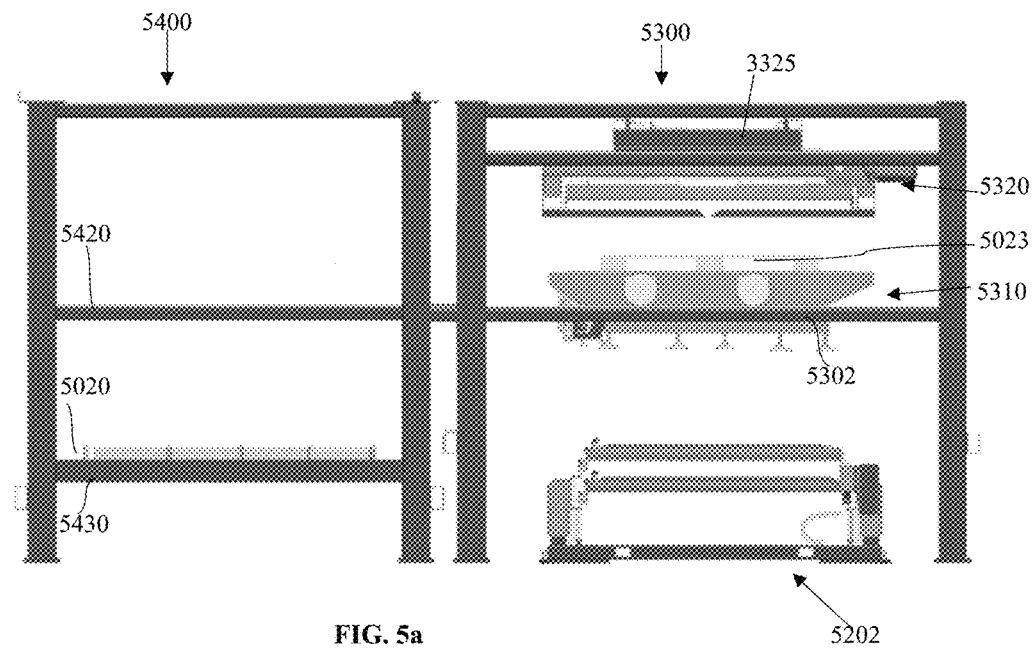
FIG. 5a illustrates a back elevation view of an exemplary MLUS configuration comprising a master module and slave module, according to an aspect.

FIG. 5a illustrates a back elevation view of an exemplary MLUS configuration comprising a master module 5300 and slave module 5400, according to an aspect. It should be noted that the combination consisting of the master module 5300 and the slave module 5400 is typically at the core of the MLUS system described herein. All other modules will be typically configured around this core combination.

As shown in FIG. 5a, the master module 5300 is positioned around a shuttle table 5202 and a slave module 5400 is positioned in this example on the left side of the master module 5300. Also shown in the figure is a stack of raw materials 5020 on the material pallet supports 5430 and a wooden pallet 5023 resting atop the loading element 5310. The loading element rails 5302 of the master module 5300 and the loading element rails 5420 of the slave module 5400 are sown aligned, such that the loading element 5310 may roll from the master module 5300 to the slave module 5400 and back, as disclosed hereinabove, to pick up material sheets 5020, one at a time, and deliver it to shuttle 5202.

The positions of the loading unit 5310 and of the unloading unit 5320 shown in FIG. 5a could be called initial, origin or rest positions.

A master module 5300 and slave module 5400 may be added to a base module (2200 of FIG. 2) to automate and speed up the loading and unloading processes. While a base module (2200 of FIG. 2) is in operation, the loading element 5310 and unloading element 5320 may wait in an optimal standby position, such that the elements may commence the loading and unloading processes immediately after the base module has completed its operation. As an example, standby positions of the loading 5310 and unloading 5320 elements may be shown by FIG. 5a, wherein the loading element 5310 is positioned above the shuttle table 5202 and the unloading element 5320 is at the top with the fork in a closed position. Alternatively, a standby position for the loading element 5310 may be on the loading element rails 5420 of the slave module 5400 directly above the raw materials 5020.

Figure 5B:
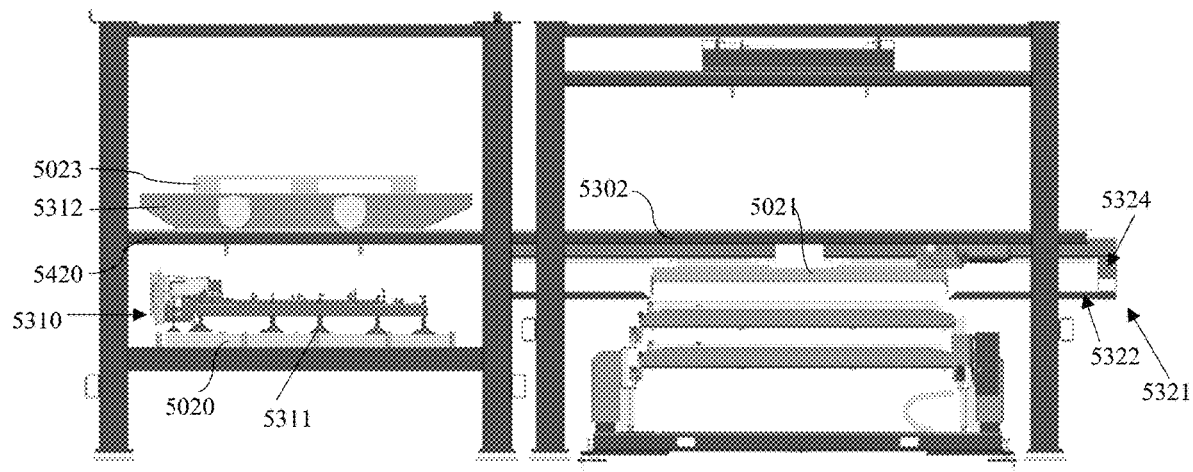
FIGS. 5b-5d illustrate back elevation views of exemplary raw material loading and cut material unloading processes, which may be performed by a master module in conjunction with a slave module, according to an aspect.
Figure 5C:
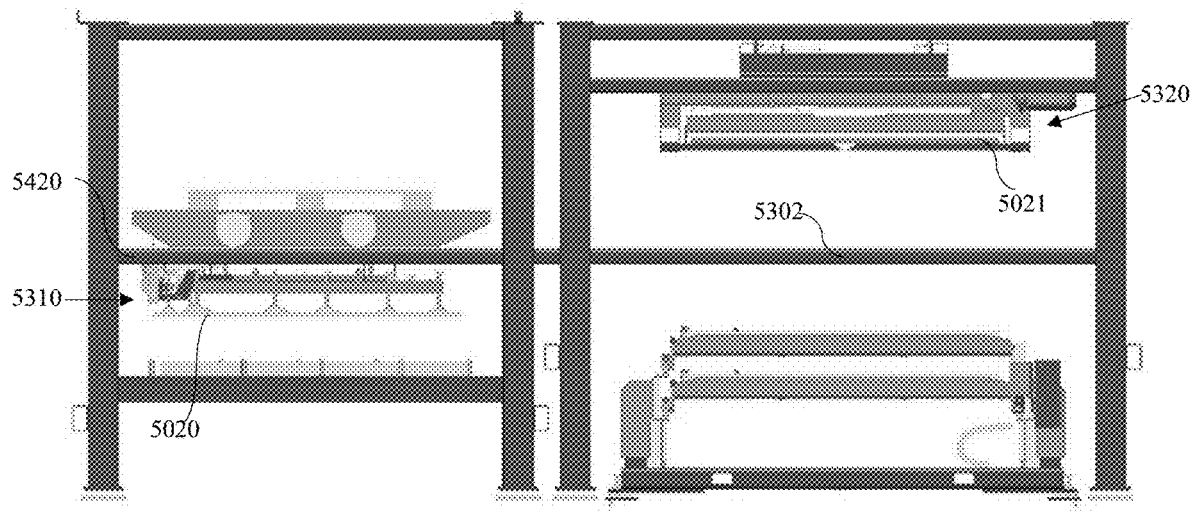
Figure 5D:
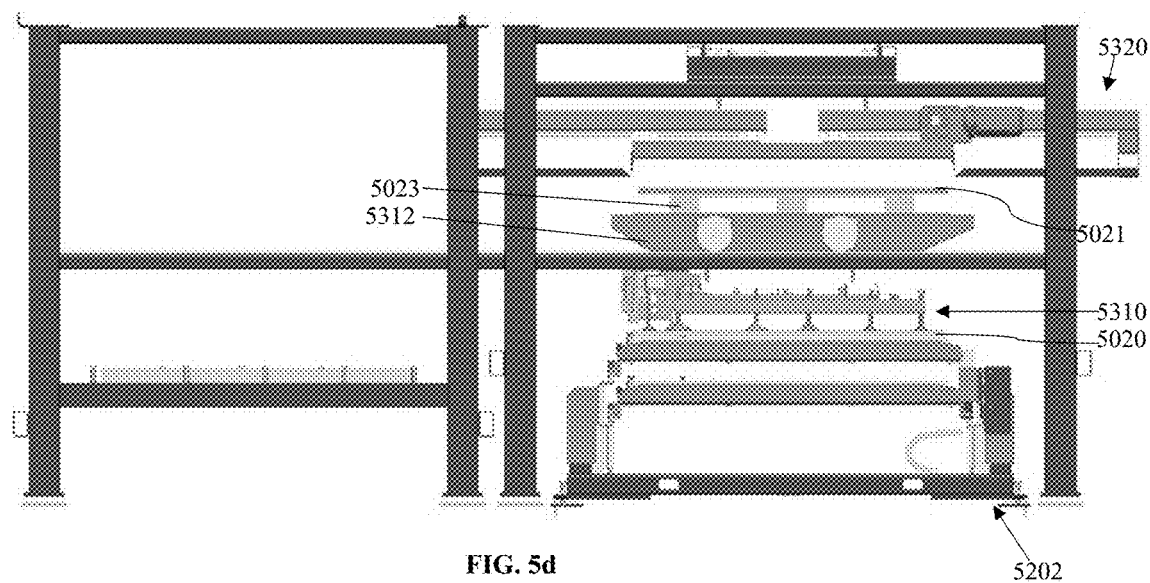

FIGS. 5b-5d illustrate back elevation views of exemplary raw material loading and cut material unloading processes, which may be performed by a master module 5300 in conjunction with a slave module 5400, according to an aspect. In an example, the loading and unloading processes may be synchronized.

As disclosed hereinbefore, the loading element 5310 of a master module 5300 may be used to load raw materials 5020 onto a shuttle table 5202. As shown in FIG. 5b the loading element 5310 may do this by lowering suction cups 5311 down onto a stack of raw materials 5020, such that, when lifted, the suction cups 5311 may pick up only one piece of raw material 5020. It should be noted that loading element 5310 may use a scissor lift (not shown) or other suitable means known in the art to lower and raise the suction cups 5311.

A shown, the loading element 5310 may be moved away, into the slave module 5400, not to be positioned above the shuttle table 5202, at the start of the unloading process, thus there may be no barriers or objects preventing the unloading element 5320 from approaching the shuttle table 5202. Therefore, the unloading element 5320 may be used to collect cut materials from the shuttle table 5202 while, for example, the suction cups 5311 of the loading element 5310 are being lowered to pick up a sheet of raw material 5020. The unloading element 5320 may accomplish this by first moving the teeth 5322 of the fork 5321 to an open position, as disclosed when referring to FIG. 3b. Once the teeth 5322 are moved to an open position, the fork 5322 may be lowered to the shuttle table 5202 via a scissor lift 3325 or other suitable means known in the art. At the lowered position, the teeth 5322 may be near the top of the shuttle table 5202 and the barriers 5324 may be surrounding the cut materials 5021, as shown in FIG. 5b.

Next, the teeth 5322 of the fork 5321 may be moved to a closed position, such that the cut materials from the shuttle table 5202 will be grabbed therefrom and will rest on the teeth 5322 when the fork 5321 is lifted. After the materials are enclosed by the teeth 5322 and barriers 5324, the fork 5321 will be lifted, as shown in FIG. 5c. During this stage in the unloading process, the loading element 5310 will be lifting once piece of raw material 5020, as shown in FIG. 5c. It should be noted that the concurrent loading and unloading operations save time and thus make the system more efficient.

Then, as shown in FIG. 5d, the loading element 5310 may roll longitudinally and position itself above the shuttle table 5202. Once the raw material is positioned directly above the shuttle table 5202, the loading element 5310 may lower the piece of raw material and disengage the suction cups 5311 and the unloading element 5320 may once again move into an open position. Thus, the loading element has deposited raw material onto the shuttle table 5202 and the unloading element 5320 had deposited cut materials 5021 onto the wooden pallet 5023 resting atop the finished parts tray 5312.

It should be understood that the above loading and unloading operations are controlled (i.e., sequenced, coordinated, etc.) by controller 1100 and its logic.

It should be noted that, depending on the needs of the user, the unloading element 5320 may be modified to move longitudinally in addition to moving vertically, as disclosed hereinafter when referring to FIG. 10.

FIG. 6a illustrates a perspective view of a top tower module ("top tower") 6500, according to an aspect. The purpose of a top tower module 6500 may be to provide convenient storage for raw and cut materials, for example. The top tower 6500 may be mounted on top of a slave module (4400 of FIG. 4a-b) or bottom tower (6510 of FIG. 6b) with the bolts 6504 located at the bottom of the frame 6505, as shown in the figure. In addition to the bolts 6504, pallet shelves 6503 may be attached to the frame 6505 to provide support for material pallets 6010. As disclose hereinafter when referring to FIG. 6c, the number of pallet shelves 6503 can be customized based on a user's particular needs.

Figure 12:
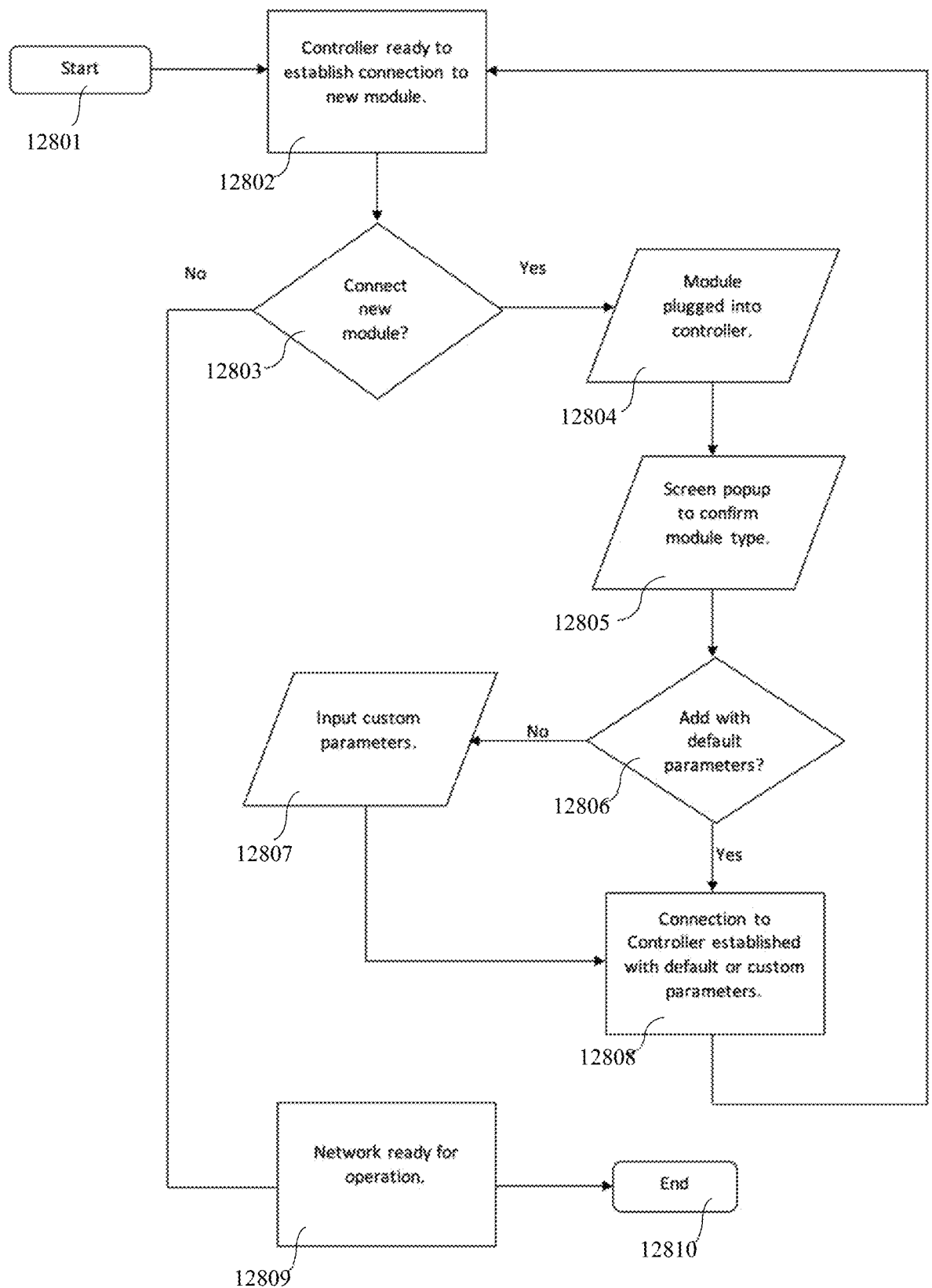
FIG. 12 illustrates an exemplary process for connecting and configuring modules to a controller via flowchart.

It should be noted that, in an example, the number of shelves, height between shelves, and other customizations of the top tower 6500 may be set by a user in custom parameters setup step (12806 of FIG. 12) of the configuration process, as disclosed when referring to FIG. 12.

FIG. 6b illustrates a perspective view of a top tower module 6500 mounted atop a bottom tower module ("bottom tower") 6510, according to an aspect. As mentioned hereinabove, a top tower 56500 may be attached to a bottom tower 6510. Similar to the top tower, the purpose of a bottom tower may be to provide a user with additional storage.

Similar to a top tower 6500, a bottom tower 6500 may also have pallet shelves mounted to the frame 6511 of the bottom tower. Unlike a top tower 6500, however, a bottom tower 6510 may be secured to the floor of a factory. Additionally, bottom tower 6510 may be provided with material pallet supports 6512 similar to the material pallet supports (4430 of FIG. 4a-b) of a slave module (4400 of FIG. 4a-b). The material pallet supports 6512 may allow a user to conveniently and easily load new material pallets onto or remove material pallets from the top tower 6500 and bottom tower 6510, as disclosed when referring to FIGS. 7a-c and 8a-i. It should be noted that, as with the material pallet supports of the slave module, the material pallets supports 6512 of the bottom tower module 6510 may be replaced with a staging cart (9700 of FIGS. 9a-b), as disclosed when referring to FIGS. 9a-b.

FIG. 6c illustrates a detailed close-up view of an exemplary method which may be used to customize the pallet shelves 6503 of a top tower 6500, according to an aspect. As shown, there may be screw holes 6502 located on the inner portion of the frame 6505 at intervals. Pallet shelves 6503 may be secured to the frame 6505 with hex screws 6501, as is known to those of ordinary skill in the art. The material pallets 6010 may then be slid onto the pallet shelves 6503, as shown. This method of attaching pallet shelves 6503 to the frame 6505 allows a user to customize the number of shelves on a top tower module 6500 as well as the height between each shelf.

It should be noted that that the same method, disclosed hereinabove, may also be used to customize the number and height of a bottom tower 6510 or to add shelves to a slave module.

FIG. 7a illustrates a perspective view of a crane module ("crane") 7600, according to an aspect. The purpose a crane module 7600 may be to transfer material pallets onto or off of a top tower (6500 of FIGS. 6a-b) or bottom tower (6510 of FIG. 6b), for example. An exemplary method which may be used to accomplish this is disclosed in greater detail when referring to FIGS. 8a-i.

As shown in FIG. 7a, a crane 7600 may be equipped with an elevator 7610 which may move between various heights to deposit or retrieve material pallets as needed. The elevator 7610 may retrieve or deposit material pallets using for example elevator chains and gears system 7612 powered by motors 7612a. Structural supports 7611 may provide structural stability to the elevator and also keep the elevator chains on the same level.

It should be understood that a crane module 7600 may be also communicatively connected to the controller 1100 (FIG. 1) when operating within an MLUS, such that the controller 1100 can control the operation of crane 7600 and coordinate it with the rest of the system. As an example, controller 1100 may receive data from a crane 7600 regarding its node number and/or status, for example. The controller 1100 may communicate the crane 7600 when and where to transfer pallets, by for example controlling the drivers of the motors 7612a. Optionally, the controller 1100 may track material pallets as they are moved by crane 7600. For example, when a crane moves a material pallet off a shelf onto a top tower and onto the pallet supports of a slave module, controller 1100 may track that movement by receiving data from various sensors (not shown) known in the art.

Figure 7C:
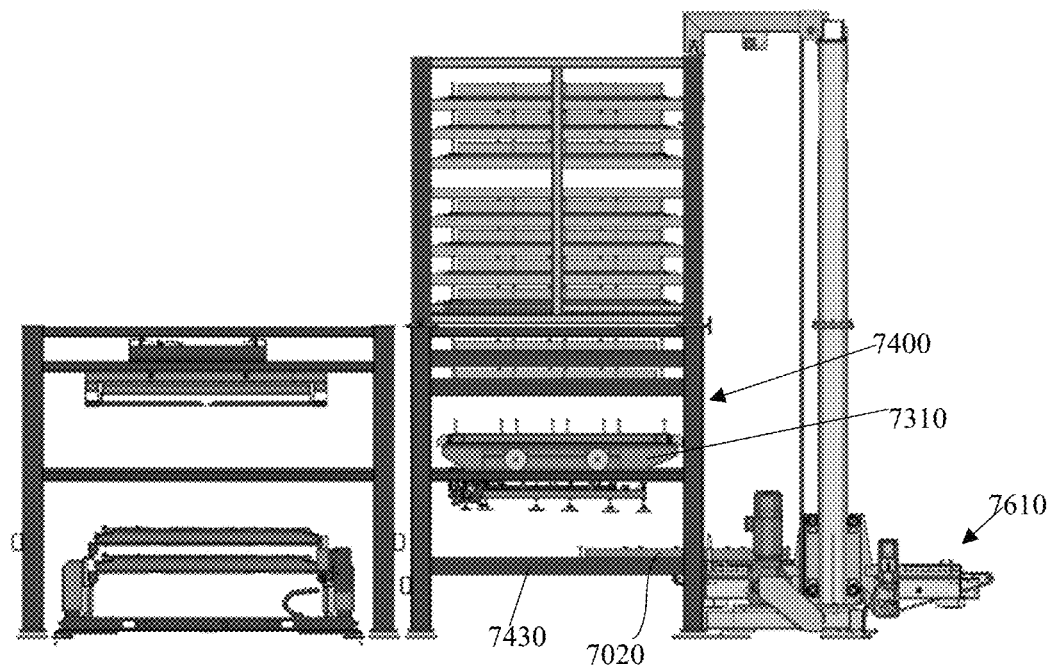

FIGS. 7b-7c illustrate a back elevation views of a crane module 7600 transporting materials from a top tower module 7500 to a slave module 7400, according to an aspect. FIGS. 7b-c show a master module 7300 mounted around a shuttle table 7202 with a slave module 7400 placed to the right of the master module 7300. A top tower 7500 is secured on top of the slave module 7400 and a crane module 7600 has been placed to the right of the slave module 7400 and top tower 7500. As shown, the crane 7600 may be secured to the MLUS by bolting the attachment arms 7601 to the top of the top tower module frame 7505.

FIG. 7b shows a crane 7600 retrieving raw materials 7020 from a top tower 7500 and FIG. 7c shows a crane 7600 depositing those materials 7020 onto the material pallet supports 7430 of the slave module 7400. An exemplary method used by a crane 7600 to retrieve and deposit material pallets is disclosed in greater detail when referring to FIGS. 8a-i.

FIGS. 8a-8i illustrate an exemplary method a crane module 8600 may use to retrieve materials from and deposit materials onto a top tower module 8500, according to an aspect.

Figure 8A:
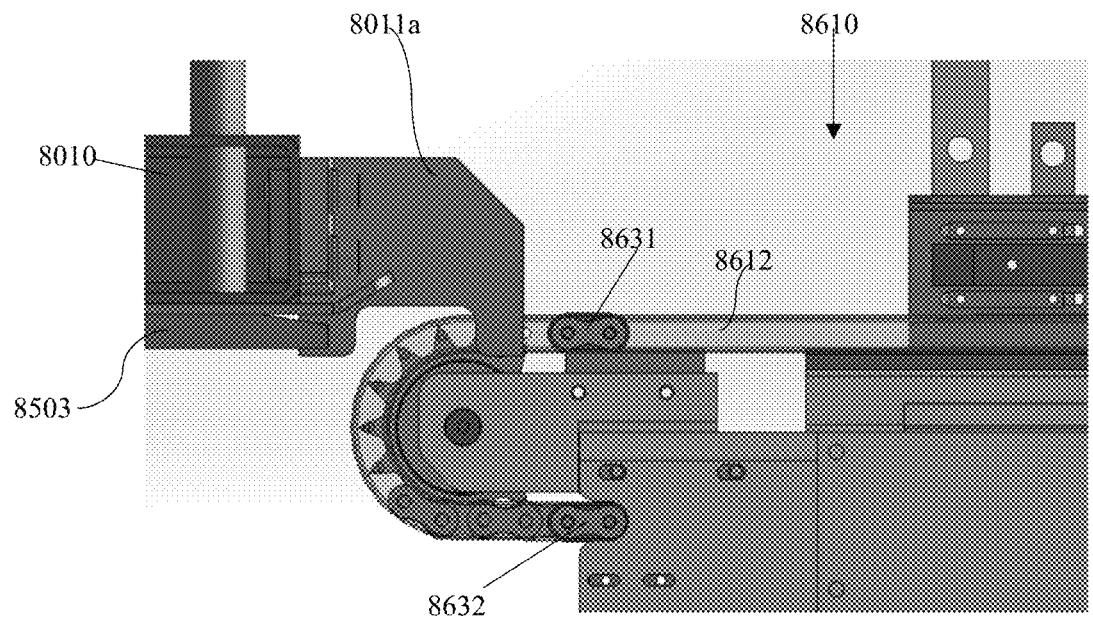

FIG. 8a shows a partial detailed view of the elevator chains 8612 of the elevator 8610 of a crane module (7600 of FIG. 7a) aligned with a pallet shelf 8503. Specifically, placed cams on elevator chains 8612, such as cam one 8631 and cam two 8632, may be used to pull or push a material pallet 8010 from or onto a pallet shelf 8503, as it will be described in more detail, hereinafter. In. FIG. 8a, cam one 8631 and cam two 8632 are shown in exemplary standby positions, wherein the material pallet 8010 is ready to be retrieved/pulled from the shelf 8503.

Figure 8B:
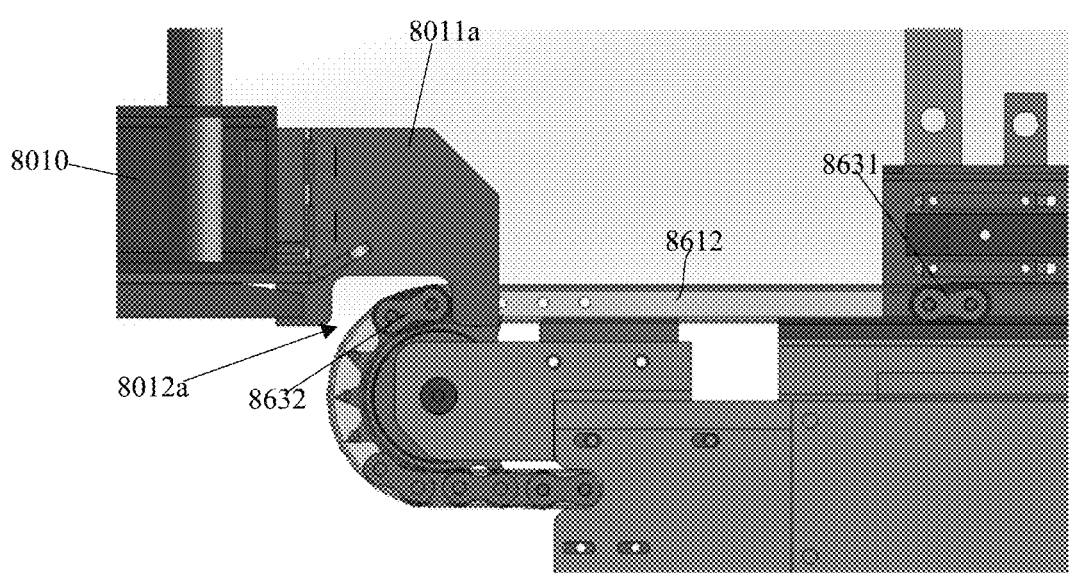
Figure 8C:
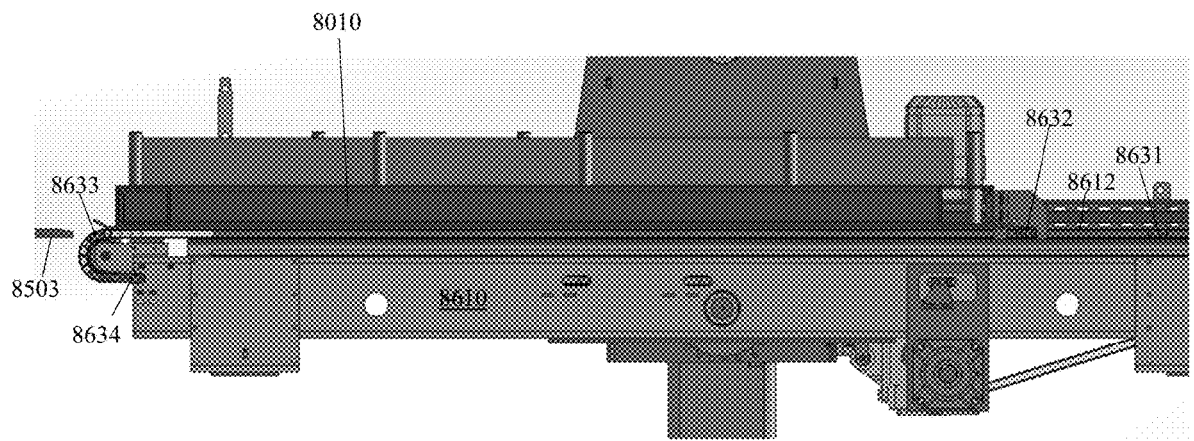

In an example, to retrieve the material pallet 8010, the elevator chains 8612 move clockwise, such that cam one 8631 moves to the right and cam two 8632 moves into the hook cutout 8012a of pallet 8010, as shown in FIG. 8b. As cam two 8632 catches the pallet hook 8011a, the elevator chains 8612 continue to move clockwise and the material pallet 8010 is pulled off of the pallet shelf 8503 and onto the elevator 8610, as shown in FIG. 8c.

Figure 8D:
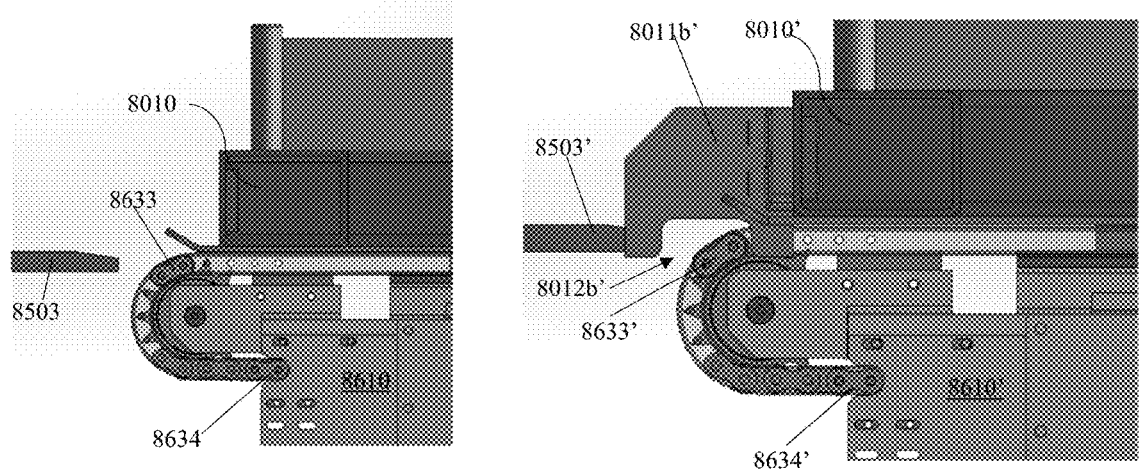

FIG. 8d shows a detailed partial view of the pallet shelf 8503 and elevator 8610 once the material pallet 8010 has been pulled onto the elevator 8610. In an example, a material pallet 8010 may have only one pallet hook (8011a of FIG. 8a), while in another example a material pallet 8010' may have a second pallet hook 8011b' on the opposite side of pallet 8010' as shown in FIG. 8d (right drawing) and in FIG. 8e.

For a material pallet 8010' with two hooks, and an elevator chains 8612 having four cams, cam three 8633' may be moved into the cutout 8012b' of the second pallet hook 8011b' and cam four 8634' may be behind it, as shown FIG. 8d (right drawing).

The elevator chains will continue to move clockwise until the material pallet 8010 is centered on the elevator 8610, as shown in FIG. 8e. In an example, when the material pallet 8010 having only one hook is centered, cam one 8631 and cam two 8632 are located to the right of the material pallet 8010 and cam three 8633 and cam four 8634 are located to the left of the material pallet 8010, in the positions shown in FIG. 8e (top drawing).

When the material pallet 8010' has two hooks 8011a' and 8011b', the elevator chains will also continue to move clockwise until the material pallet 8010' is centered on the elevator 8610'. Similar to the material pallet 8010 with one hook, cam one 8631' and cam two 8632' are located to the right of the material pallet 8010' and cam three 8633' and cam four 8634' are located to the left of the material pallet 8010', when the material pallet 8010' with two hooks is centered. As shown in FIG. 8e (bottom drawing), cam two 8632' remains in the cutout of hook 8011a' and cam three 8633' remains in the cutout of hook 8011b'.

Additionally, when a material pallet 8010 or 8010' is centered on an elevator, the elevator may then move up or down and to deliver said material pallet to its new destination. As an example, the new destination of a material pallet may be on a different pallet shelf or on a slave module.

Figure 8F:
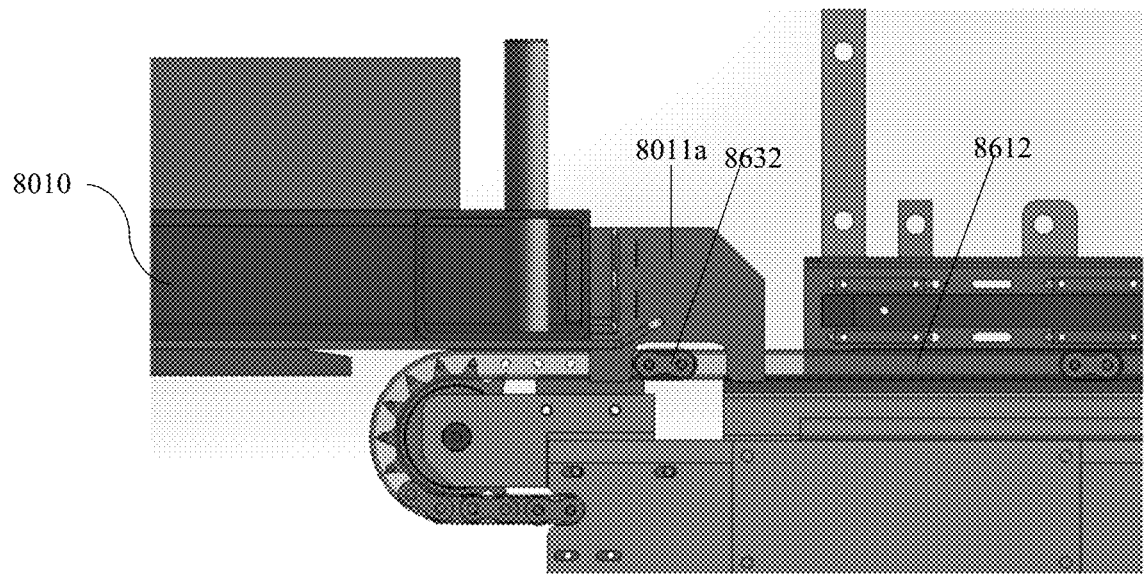

FIG. 8f shows a crane module depositing (pushing) a material pallet 8010 onto a pallet shelf 8503. A crane module may do this by having the elevator chains 8612 reverse direction, i.e., move counter-clockwise. As shown, cam two 8632 pushes the material pallet 8010 onto a pallet shelf 8503 by pushing on the pallet hook 8011a.

Figure 8G:
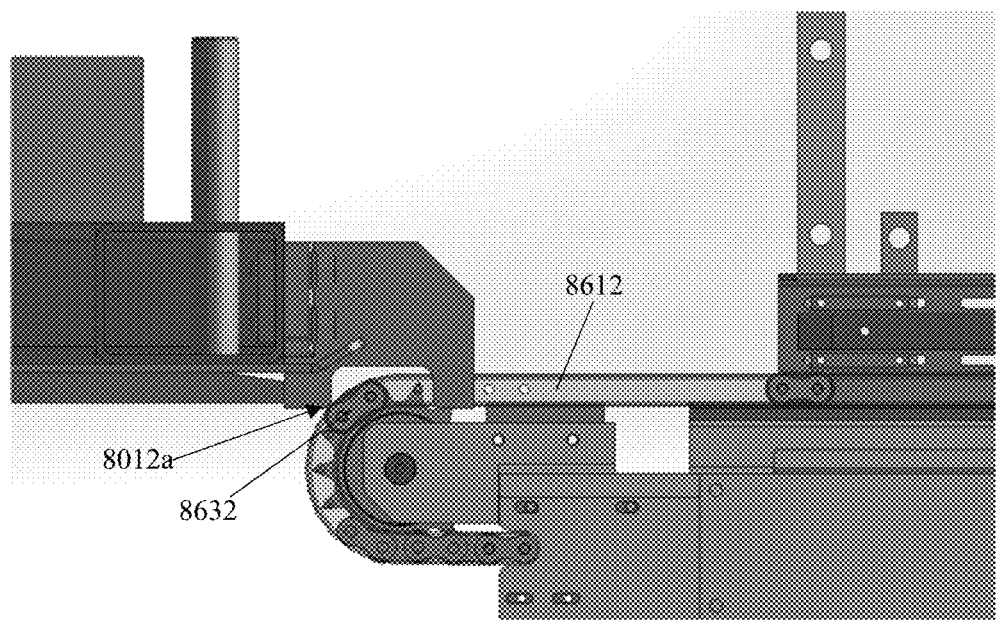
Figure 8H:
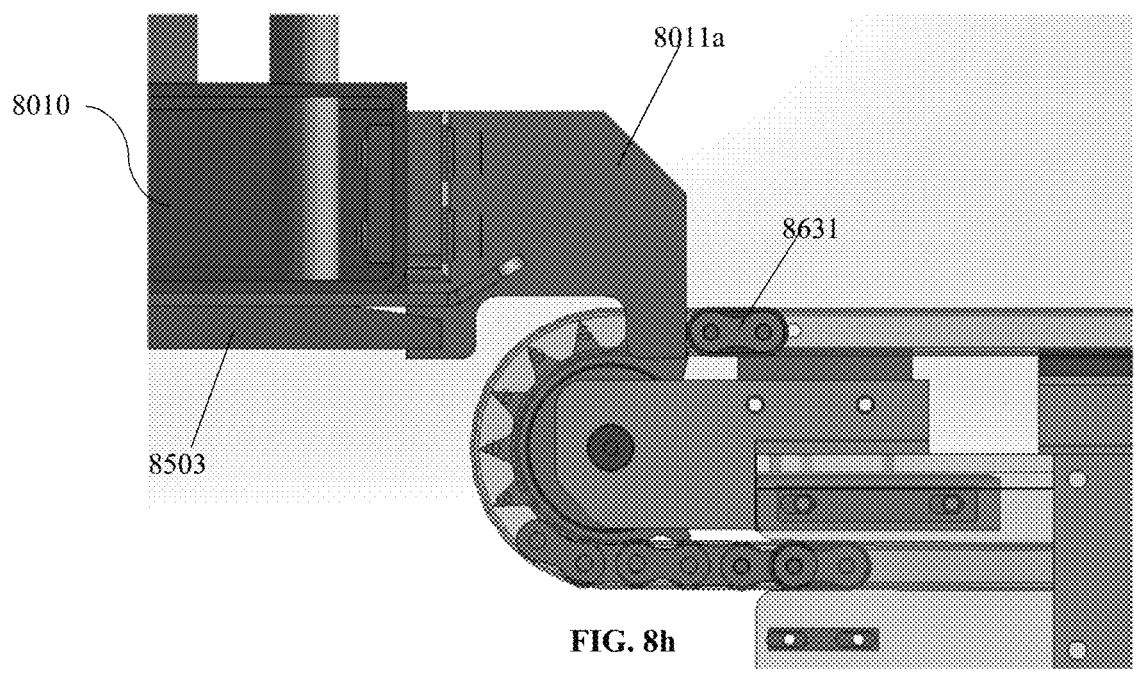
Figure 8I:
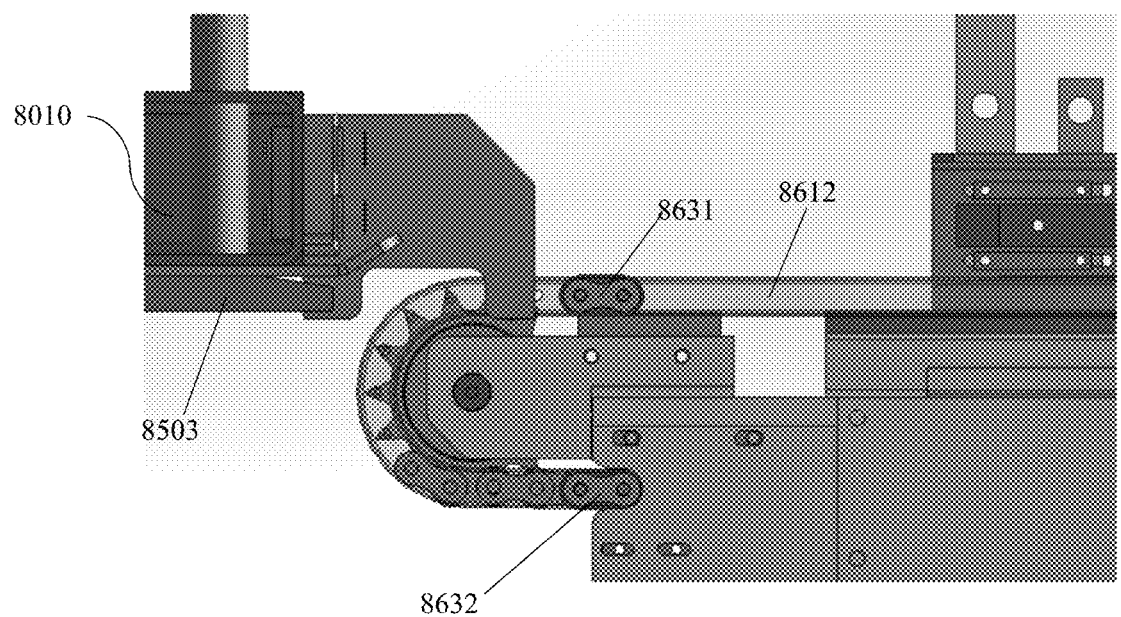

As the elevator chains continue to move counter-clockwise, cam two 8632 exits the hook cutout 8012a, as shown in FIG. 8g. Then, as shown by FIG. 8h, cam one 8631 pushes the material pallet 8010 the rest of the way onto the pallet shelf 8503. Thus, cam one 8631 helps position the pallet repeatably and reliably in the same, desirable spot on shelf 8503, after the cam 8632 escapes from the hook. Once the material pallet has been completely pushed onto the pallet shelf 8503, cam one 8631 and cam two 8632 are moved clockwise by the elevator chains 8612 back into the standby position, as shown by FIG. 8i.

Figure 9B:
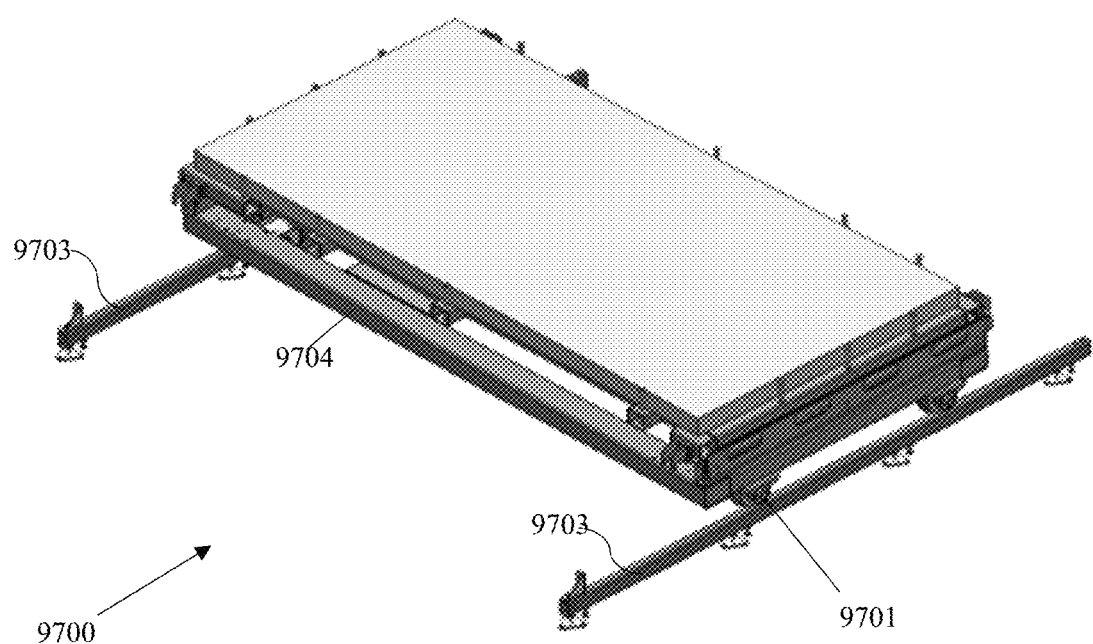

FIGS. 9a-9b illustrate perspective views of exemplary embodiments of a staging cart module ("staging cart") 9700, according to an aspect. As mentioned hereinbefore, the pallet supports 4430, 6512 of a slave module 4400 or a bottom tower module 6510 (disclosed when referring to FIGS. 4a-b and 6b, respectively) may be replaced by a staging cart 9700.

FIG. 9a shows a staging cart 9700 with wheels 9701 secured to the left and right sides of the cart frame 9704, such that the staging cart 9700 can be placed on latitudinal rails 9702. A material pallet 9010 with raw materials 9020 is shown to be placed atop the staging cart frame 9704. FIG. 9b shows a staging cart 9700 with wheel 9701 secured to the front and back sides of the cart frame 9704, such that the staging cart 9700 can be placed on longitudinal rails 9702.

It should be noted that a staging cart 9700 may be manually operated by a user, or it can be automated using motors (not shown) and motor drivers which are data connected to controller 1100.

Figure 10:
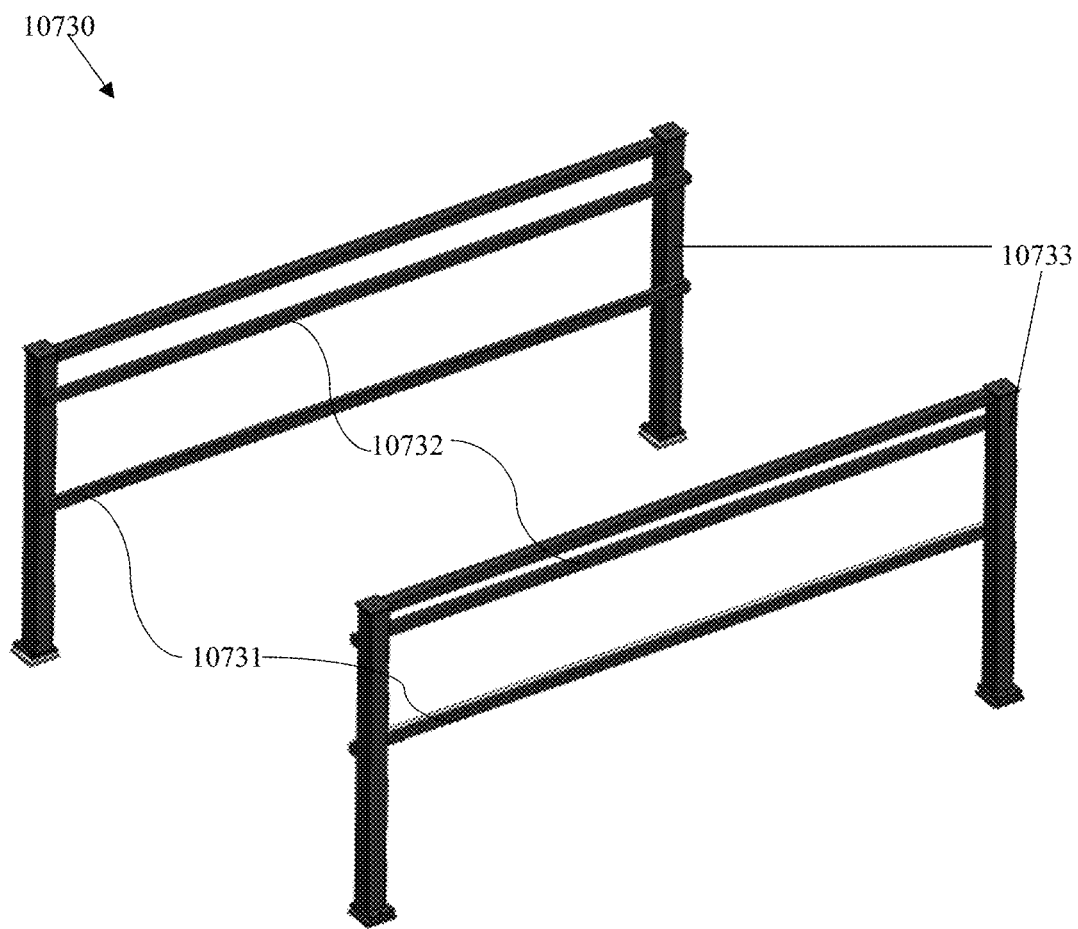
FIG. 10 illustrates a perspective view of an insert module ("insert"), according to an aspect.

FIG. 10 illustrates a perspective view of an insert module ("insert") 10700, according to an aspect. An insert 10700 may have a frame 10733, loading element rails 10731, and unloading element rails 10732, as shown. It should be noted that the loading element rails 10731 and unloading element rails may align with the loading element rails and unloading element rails of a slave module (4400 of FIGS. 4a-b), respectively.

The purpose of an insert module 10730 may be to allow a user to implement an MLUS with two base modules (2200 of FIG. 2), for example. The insert 10730 may do this by giving the loading 3310 and unloading 3320 elements of a master module 3300, disclosed when referring to FIGS. 3a-c, an extended range of motion, latitudinally. In other words, the loading element 3310 can freely roll from the rails 3302 of the master module 3300, onto the rails 10731 of an insert module, and then onto the rails of a slave module 4420. Similarly, the unloading element 3320 can freely roll longitudinally from the rails of the master module and onto the rails of an insert module. This allows the loading 3310 and unloading 3320 elements to be positioned above the shuttle tables of each base modules, as needed. It should be noted an exemplary configuration of an MLUS with two base modules is disclosed hereinbelow when referring to FIG. 11f.

FIGS. 11a-11g illustrate exemplary MLUS configurations, according to an aspect. It should be noted that, in all of the exemplary configurations illustrated by FIGS. 11a-11b, the modules shown may operate as disclosed hereinabove. It should also be noted again that the modules with moving elements (i.e., the master module 11300 and laser-shuttle system 11200) may be communicatively connected to controller 1100, to facilitate synchronized movements of the moving elements (e.g., loading and unloading elements of the master module, the shuttle, etc.). More specifically, as an example, the controller 1100 may instruct the modules to perform tasks at specific times to efficiently load material onto and unload material off the shuttle of the base module 11200, thus resulting in faster loading and unloading processes.

It should also be noted that an MLUS is not limited to the exemplary configurations shown in FIGS. 11a-g. It should be understood that an MLUS can be expanded latitudinally, longitudinally or vertically (e.g., by using the towers), according to a user's requirements and space limitations.

Figure 11A:
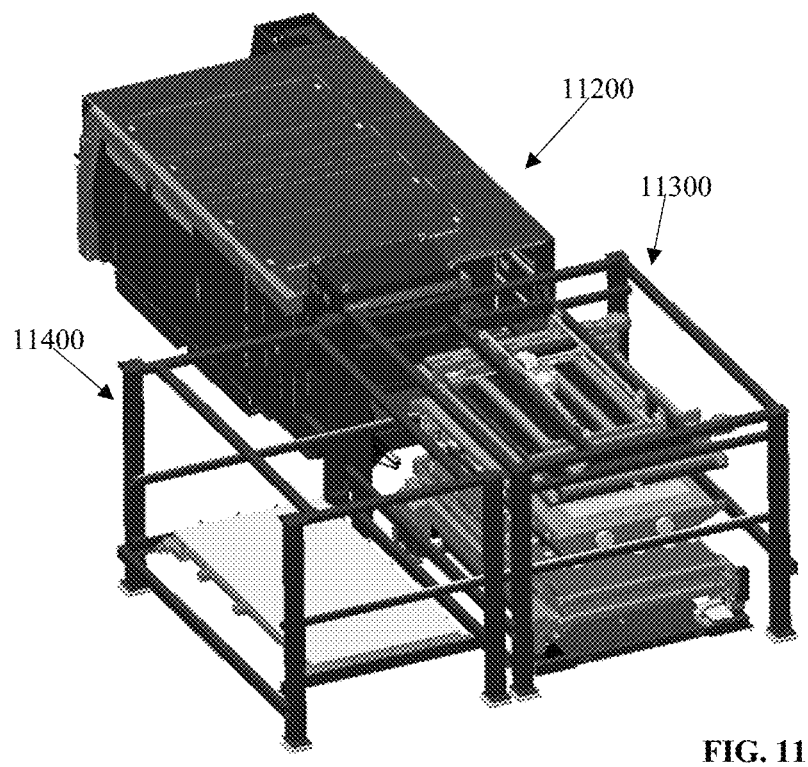
FIGS. 11a-11g illustrate exemplary MLUS configurations, according to an aspect.

FIG. 11a shows a base module 11200 with a master module 11300 mounted at the back and a slave module 11400 mounted on the left side. The controller 1100 may know that the slave module 11400 is positioned to the left/front (as opposed to the right/back) of the master module 11300 by input/confirmation by the operator (e.g., by the operator checking the 14885 box "Front Loading" in FIG. 14). The controller 1100 may know how long will the loading element need to travel in order to properly pick up the sheet of raw material from the slave module by for example knowing the fixed dimensions of the slave module 1400, dimensions which may be fed to controller 1100 during programming. In an example, a default value may be provided, which is a programmed dimension value of the system. However, an operator or service engineer may adjust the travel distance if the system has different dimension and/or built up tolerance, etc.

The slave module 11400 may have absolute position sensors (not shown) to detect the position of the loading element 5310 and unloading element 5320 from FIG. 5a at all time.

Figure 11B:
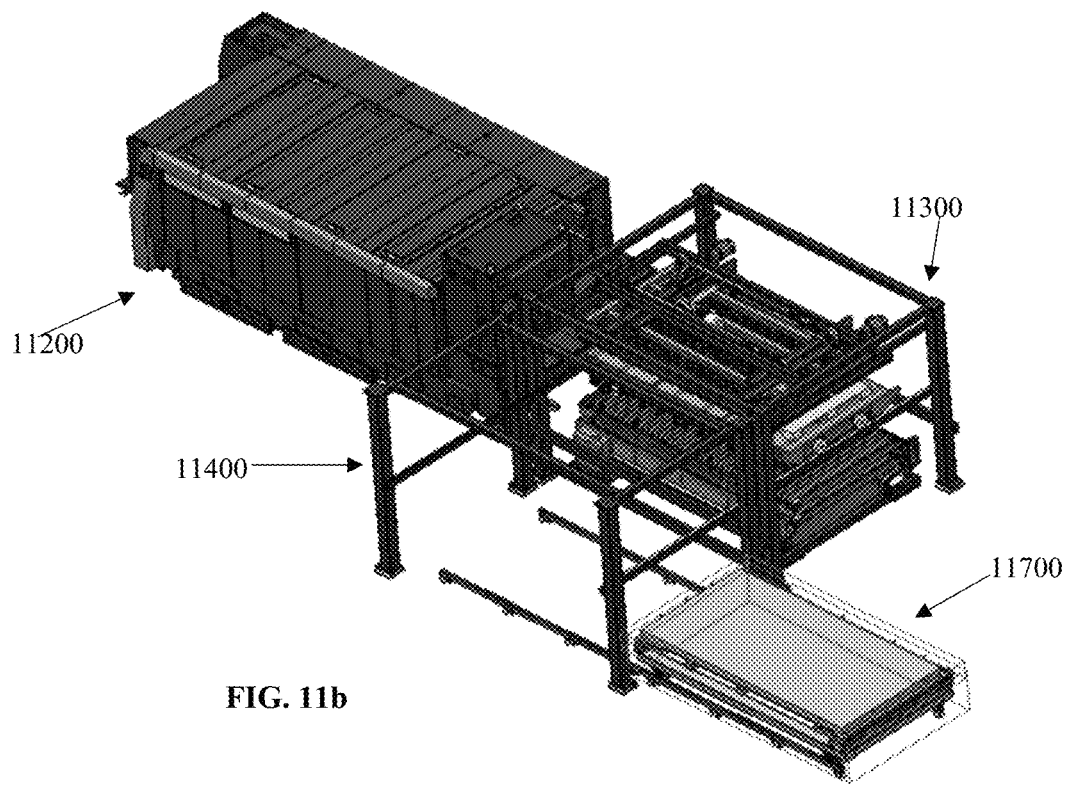

Similar to FIG. 11a, FIG. 11b shows a base module 11200 with a master module 11300 mounted at the back and a slave module 11400 mounted on the left side. However, FIG. 11b differs from FIG. 11a in that a staging cart 11700 is positioned beneath the slave module 11400 in place of material pallet shelve (4430 of FIGS. 4a-b). As shown, the staging cart 11700 may be adapted to roll in and out of the slave module 11400 to facilitate loading of raw material onto it while the staging cart 11700 is out of the slave module 11400.

Figure 11C:
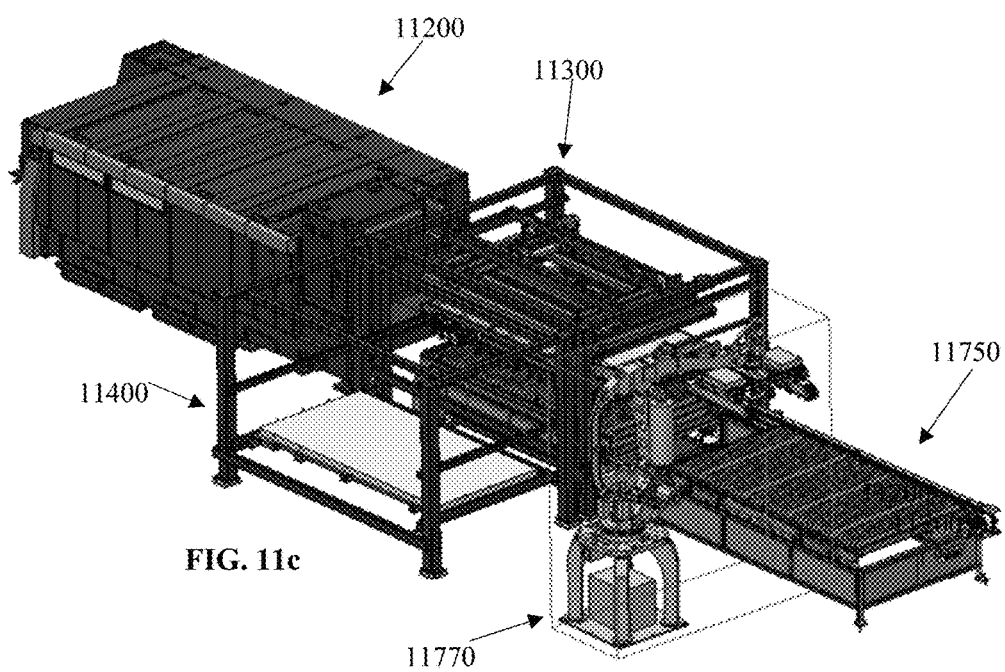

FIG. 11c shows the configuration of FIG. 11a with two additional modules: a rear output station module ("rear output station," "ROS") 11750, and a sorting robot module ("sorting robot") 11770. A rear output station module 11750, may provide a second location for cut materials (finished parts) to be unloaded. ROS 11750 may have a motor with chain and a cam (not shown) and each pallet may have a cam block on ROS 11750 side of the system. When the controller 1100 receives data that the parts are assign to the ROS 11750, it sends command to switch pallets between shuttle table 5202 (FIG. 5a) and ROS 11750 (FIG. 11c)). As an example, a sorting robot 11770, known in the art, may be configured to remove cut materials from the ROS 11750 and sort them. In an example, once the sorting robot 11770 is communicatively connected to controller 1100, the controller 1100 may be programmed to send pickup and drop-off location instructions to the robot via coordinates (e.g., X-150 mm, Y-250 mm).

Figure 11D:
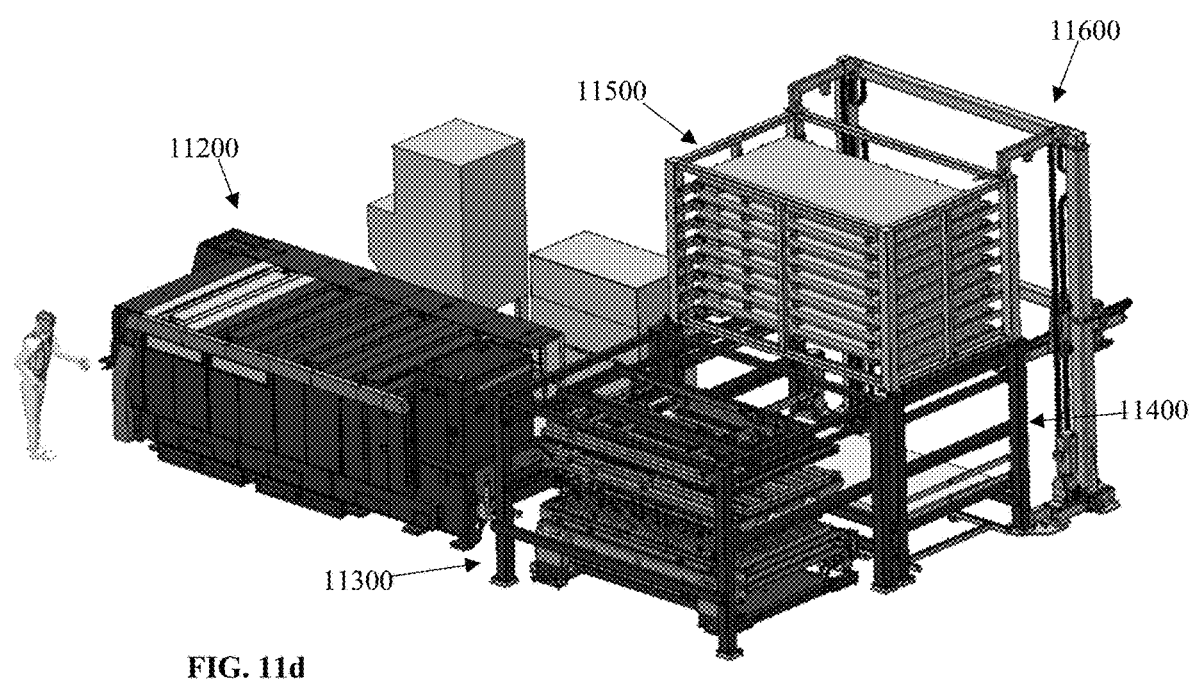

FIG. 11d shows a base module 11200 with a master module 11300, slave module 11400, tower module 11500, and crane module 11600 mounted to the right side of the base module 11200. The modules shown in FIG. 11d may be mounted around the base module and function similar to the configuration described above when referring to FIGS. 7b-c.

Figure 11E:
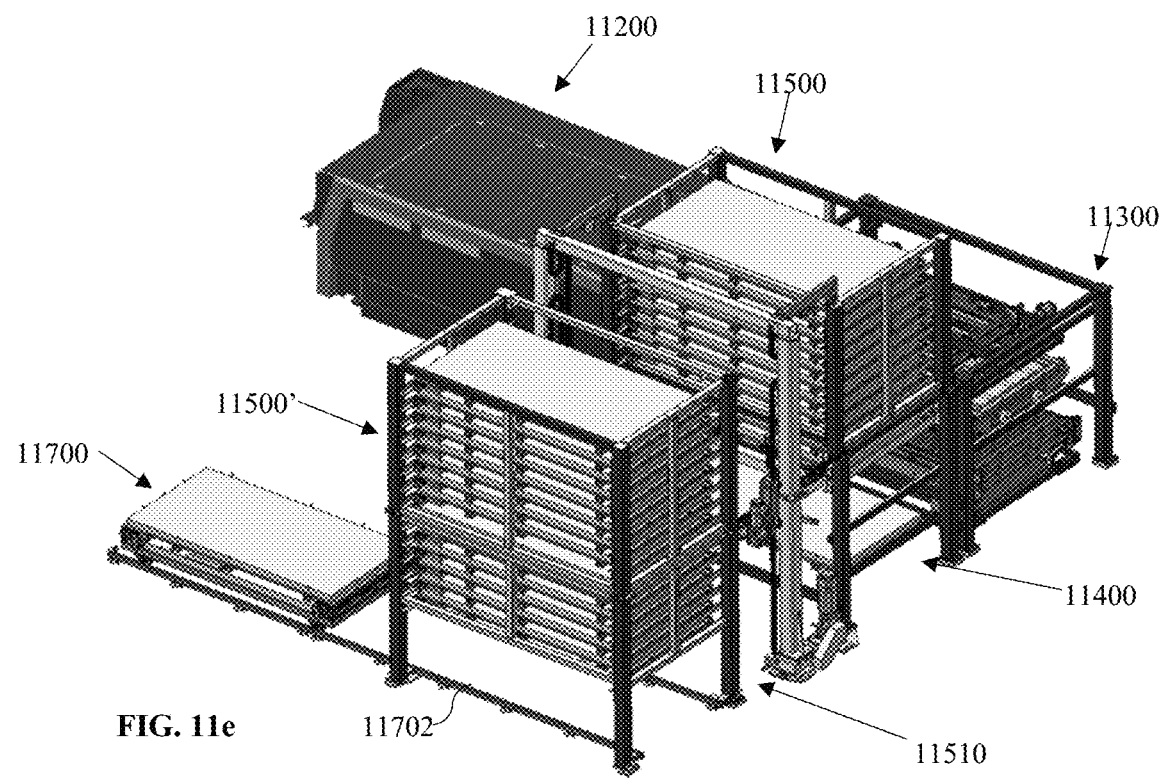

FIG. 11e shows a configuration wherein a master module 11300, slave module 11400, top tower module 11500, and crane module 11600 are positioned to the left of the base module 11200. Additionally, a bottom tower module 11510 with a staging cart and a second top tower module 11500' is positioned to the left of the crane 11600. As shown, a staging cart 11700 on latitudinal rails 11702 may be positioned underneath the bottom tower module 11510. In this configuration, the crane 11600 can for example serve raw material from all of the three towers to the slave module 11400 for pickup by the loading element of the master module 11300. It should be noted that the additional storage capacity provided by the towers allows for example for more flexibility in providing the MLUS system with raw material of different characteristics (e.g., different sheet thickness).

Figure 11F:
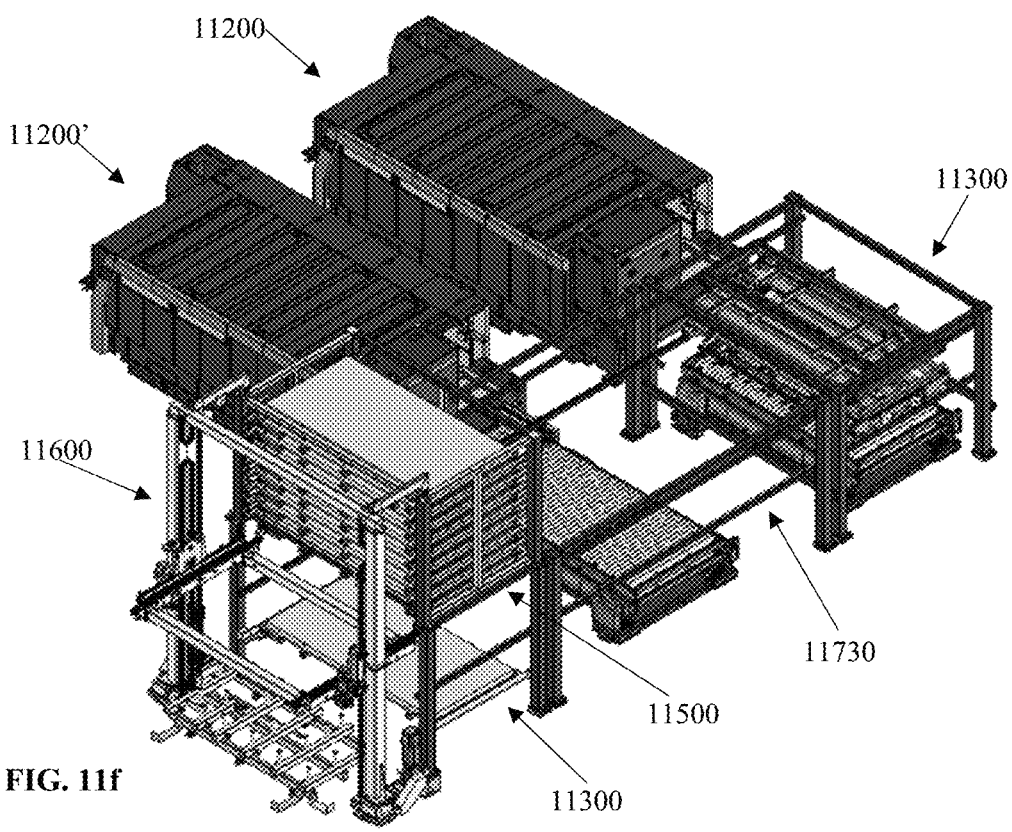

FIG. 11f shows an exemplary configuration, wherein two base modules 11200 and 11200' can be utilized. As shown, a master module 11300 has been mounted around the shuttle of a base module 11200. A second laser 11200' can be configured as any other added module that has moving elements and thus needs to be communicatively connected to and controlled by controller 1100. Additionally, in this example, an insert module 11730 and second base module 11200' are positioned directly to the left of the master module 11300 and base module 11200, respectively. To the left of the insert module 11730, a slave module 11300 with a top tower mounted 11500 to it is positioned. A crane is secured to the left of the top tower 11500 and slave module 11300, as shown.

The insert module 11730 enables the loading and unloading elements of the master module 11300 to travel to and from the slave module 11300 and between the shuttle tables of each base module 11200 and 11200', such that said elements can perform the loading and unloading processes, as disclosed hereinbefore when referring to FIG. 10.

Figure 11G:
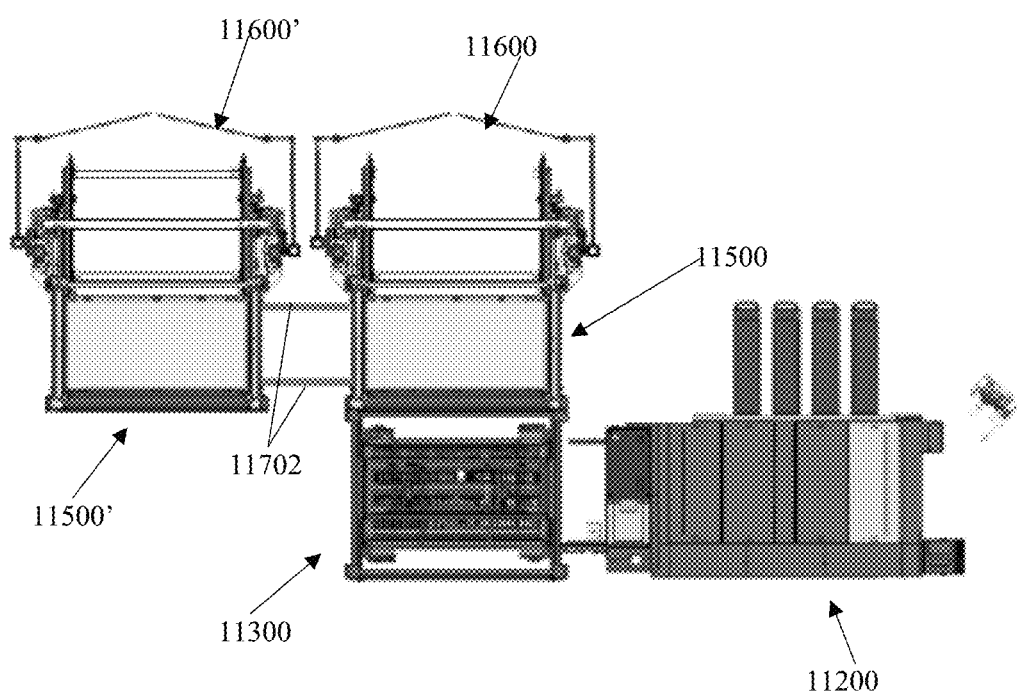

FIG. 11g a top view of an exemplary MLUS configuration, wherein the MLUS is extended latitudinally. As shown, a master module 11300 has been mounted above the shuttle table (not visible) of a base module 11200 and a slave module (not visible) with a top tower module 11500 has been place on the left side of the master module 11300. A crane module 11600 is positioned on the left side of the slave module and top tower 11500, as shown. Additionally, a bottom tower module (not visible) with a second top tower 11500' and second crane 11600' are positioned to the back side of the slave, top tower 11500, and crane 11600 modules. A staging cart (not visible) may roll on latitudinal rails 11702 between the bottom tower and slave.

FIG. 12 illustrates an exemplary process for connecting and configuring modules to/into a controller 1100.

At the start 12801 of the connection and configuration process, the controller must be ready to establish a connection to a new module 12802. After the controller is ready, a user is presented with the option to connect a new module 12803. If a user does wish to connect a new module, i.e., the user selects yes, the user must then connect the new module to the controller 1100 for example by plugging a cable into a controller's module connection panel 12804. It should be noted that alternatively the process could start directly at step 12804 with the operator connecting the cable of the new module to the controller 1100.

Then, due to the pre-programming of the controller 1100 with all MLUS possible network configurations, including the node addresses or IP addresses of each of the MLUS modules with moving parts, the controller 1100 may automatically recognize the module type based on for example the module's node address, and a screen may popup on the GUI for a user to confirm the module type 12805. Once the module type has been confirmed, a user will be presented with the option to add the module with default parameters 12806. If a user selects yes, then the connection between the new module and the controller is established 12808, and the controller will once again be ready to establish a new connection 12802. If a user selects no, i.e., they wish to connect the module with custom parameters, then the user will be presented with a screen to input their custom parameters 12807.

After the parameters have been entered, then the connection between the new module and the controller is established 12808, and the user the controller will once again be ready to establish a new connection 12802. It should be noted that exemplary custom parameters of a module are disclosed herein for example when referring to FIG. 14.

At this stage, a user can continue adding new modules by following steps 12803 through 12808, or, alternatively 12804-12808, as described above. Once a user has finished adding modules, they can select no at step 12803 and the MLUS network will be ready operation. Now, the connection and configuration process is completed 12810 and the new MLUS configuration is ready for operation.

Figure 13:
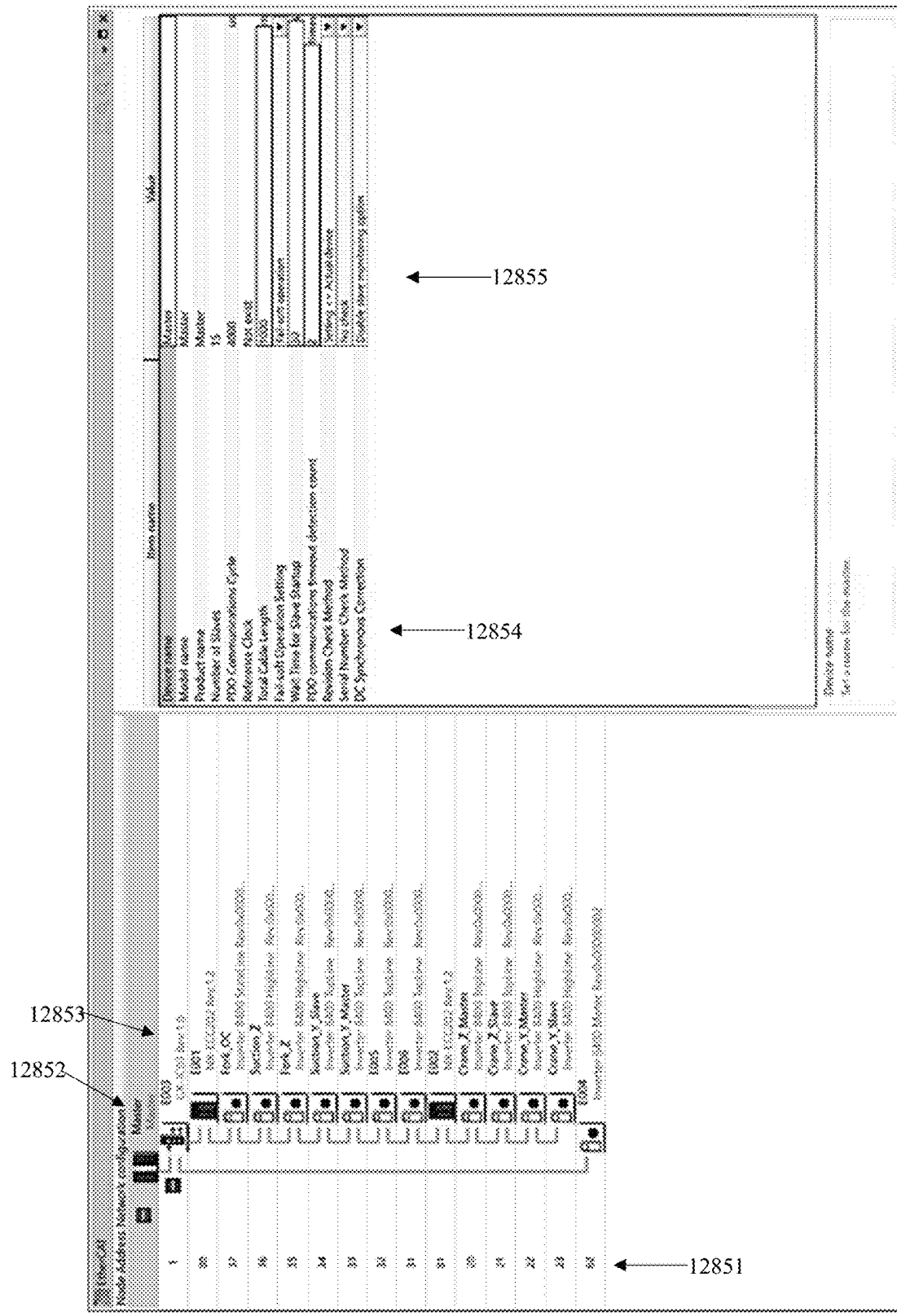
FIG. 13 illustrates an exemplary controller software interface showing an exemplary module network configuration, according to an aspect.

FIG. 13 illustrates an exemplary controller software interface ("administrator interface," "software interface," "SI") showing an exemplary module network configuration, according to an aspect. More specifically, FIG. 13 shows a master control module 12852 (i.e., controller 1100 described herein) with a list of the master control module's 12852 associated slave control modules 12853 under its control and their respective node addresses 12851, as an example. As mentioned hereinbefore when, referring to step 12805 of FIG. 12, a controller may automatically recognize an added module based on its specific node address 12851. Also shown by FIG. 13 is a list of properties 12854 associated with a module, wherein some values 12855 may be changed by the programmer as appropriate during for example the network configuration.

In the example shown by FIG. 13, a master control module 12852 has a node address 12851 of 1. The master control module's associate components and their respective slave modules under the master's control 12853 may be that of suction cups, a fork, and a crane (all three described hereinbefore) with node addresses of 37, 36, and 20, respectively. As shown, exemplary properties 12854 associated with the maser control module 12852 may be the module's name, product name, number of slaves, and so on.

Figure 14:
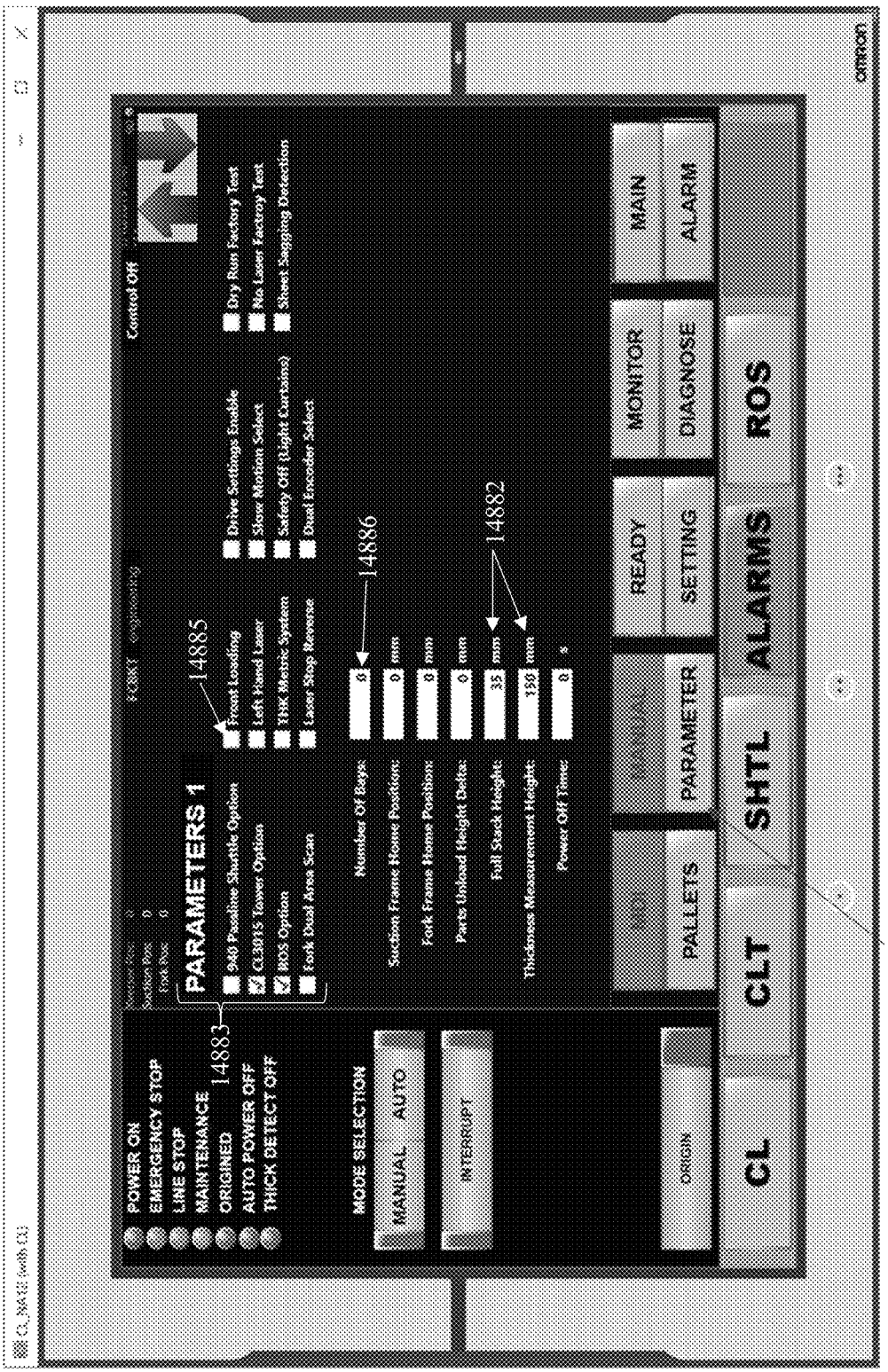
FIG. 14 illustrates an exemplary parameter customization screen which may appear on a graphical user interface during a new module connection process, according to an aspect.

FIG. 14 illustrates an exemplary parameter customization screen which may appear on a graphical user interface ("GUI") during a new module connection and configuration process, according to an aspect. A user can select to manually enter parameters 14881, discussed hereinbefore when referring to step 12807 of FIG. 12. As an example, the two parameters shown at 14882 can be entered. First parameter number (35 mm) shows the position when the controller 1100 detects that there is no more room to unload parts on wooden pallet 5023 from FIG. 5a. Second parameter number (150 mm) tells the controller 1100 at which height over the top of the stack of raw material (5020 of FIG. 5a) to measure thickness of material. Additionally, FIG. 14 shows a list of parameters 14883 that may be customized, such as selecting a "tower option" and an "ROS option." As an example, a MLUS with a "tower option" may be similar to the configuration shown when referring to FIG. 11d and a MLUS with an "ROS option" may be similar to the configuration shown when referring to FIG. 11c. As another example, for the "Number of Bays" box 14886 the default number is 2 when only one laser system is served, as shown in FIG. 11a for example. To simplify, box 14886 should have a number that defines the number of stops that loading element 5310 (FIG. 5a) can make. Each position that loading element 5310 can stop is considered a "Bay." Therefore, two laser systems, with no other option, would be a 3 bay system ($1^{st}$ bay: Slave—pickup; $2^{nd}$ bay: laser #1; $3^{rd}$ bay: laser #2).

The automation of the MLUS system disclosed herein may be implemented using standard industrial network protocols, such as EtherNet/IP and EtherCAT (Ethernet for Control Automation Technology). The EtherCAT protocol is standardized in IEC 61158. The controller 1100 used in the present invention may be programmed for example with Omron's Network Configurator for Ethernet/IP (software used to graphically build, set and manage Ethernet/IP networks) and Sysmac Studio (the headquarters of OMRON Corporation is located in Kyoto, Japan). The controller 1100 may have a predefined network and may periodically check for connected modules. Whenever a new module is connected, the controller 1100 may turn on a flag or prompt indicating a newly detected module, and, after the user's acceptance, communication is established between the controller 1100 and the new module.

After the user accepts the newly added module, the connection is finalized and the module is ready to be used within the system, as described herein.

The steps that may be used to establish the connection of the new module (such as the crane module) to the controller are as follows:

The module is placed at a predetermined position from the controller, as described herein.

Then, the module (e.g., 1102a) is attached to the controller 1100 using for example communication (e.g., Ethercat and/or Ethernet) cables. Electrical power (e.g., 480 V) can be applied to the controller or separate power may be brought to the module depending on system's power requirements.

After the controller and the base module 1200 are also communicatively connected together, the communication interface selected enables the controller 1100 to communicate with base module 1200. If it is EtherCAT, the controller 1100 portion of the system is configured with all EtherCAT nodes, the nodes being disabled.

It should be understood that only modules that have moving parts that have to be controlled by the controller 1100 will normally be communicatively connected to the controller 1100. It should be also understood that when for example the EtherCAT protocol is used, the modules with moving parts may have motor controllers, motor drivers, EtherCAT cards, etc., as known in the art, to enable communication with the controller 1100 (e.g., provide the added module's node number to the controller 1100). As an example, motor drives, which have EtherCAT cards, may be associated with motors 3323, in order for the controller 1100 to be able to communicate with and control the fork 3321 of the unloading element 3320 of the master module 3300 (FIG. 3).

In an example, the controller 1100 (master controller) may know from the node number of a slave controller (e.g., the controller of a shuttle, of a crane, of a staging cart) the type of module that was added to the system (e.g., that a shuttle, a crane, or a staging cart was added) and may receive all the diagnostics of the particular module.

It should be noted that in an example, all parameters (i.e., pre-programmed and customizable parameters) may have default values. Only the values of some parameters (i.e., customizable parameters) can be modified by the operator, such as stopping positions of the bays, heights of the travel over shuttle table, material pallet, unload pallet, etc., speed of the travel for loading element 5310 and unloading element 5320 (forward/backward and up/down).

Once the proper module is attached, using for example the Sysmac software developed by OMRON, the installer will forward the module's node address (see 12851 in FIG. 13) to the controller 1100. By doing so, the controller now recognizes the module and provides a list of parameters to configure the module in a predetermined manner (see FIG. 14).

In the case of EthernNET/IP, a general list determines which IP address the module will use and a data exchange is configured in the controller so that the controller can talk to the module via EtherNET/IP (Ethernet communication protocol). Once this data is shared between the controller 1100 and the respective module, a list of parameters will be activated to be confirmed or set by the operator to configure the module.

The controller 1100 may have place in memory to store the EtherNET/IP address and/or all EtherCAT node configurations. The EtherNET/IP data exchange information may also be stored in controller 1100, all the configurations being stored for example in a file using the Sysmac Studio software.

Once the controller 1100 knows the existence of the module, the HMI (human operator interface) enables hidden parameters that determine how the controller interacts with the module (all these parameters are stored in non-volatile memory). These parameters may be exported to a text file into a storage device or flash drive card for backup purposes.

Note that each module that will be attached to the controller 1100 has a unique ID number. The ID number contains a unique EtherCAT node number and/or Ethernet IP address.

A controller which has been successfully utilized in the system of the present invention is the Omron NJ series controller.

The default parameters may be divided into two types: The first type of default parameters can determine the minimum configuration of the system (no devices added), which can be populated by EtherCAT or EtherNET/IP flags. The second type of default parameters can determine the positioning, speed and height of for example the material loading unit/element 3310 and the part unloading unit/element 3320, and in which direction(s) each moves.

The custom parameters are unique to the module added and how they interact with the MLUS system and controller 1100. For example, the operator can be prompted to select whether the crane 11600 is positioned to the right (see FIG. 11*d*) or to the left (see FIG. 11*d*) of the slave module 11400. As another example, when an additional shuttle and laser 11200' (FIG. 11*f*) are added to the MLUS system via the insert module 11730 as described hereinbefore, the additional shuttle may have a cable (e.g., EtherCAT) plugged into the control 1100 to provide the node number of the additional shuttle to controller 1100. By the node number assigned to the additional shuttle, the control 1100 may now know that an additional shuttle will be served by the master module 11300 (see FIG. 11*f*). The operator may then be prompted to select which bay number the added shuttle is. If it is Bay 2 (knowing that Bay 1 is the default, first shuttle associated with the master module 11300), the controller will know that the added shuttle is next to the master module and thus will also know the distance, i.e., how far away the added shuttle is from the master module 11300 and how far away the loading and unloading elements of the master module 11300 will have to travel to, for example, serve the added shuttle.

The present invention thus provides a flexible and adaptable technique for adding modules to a basic loading and unloading system, such as the laser cutting system noted hereinabove, without physically modifying existing components, thus reducing costs to a customer seeking to expand its business.

It may be advantageous to set forth definitions of certain words and phrases used in this patent document. The term "logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:
1. A modular loading and unloading system comprising:
a master module comprising:
a first frame adapted for positioning over a first shuttle that feeds material sheets into a first material sheet processing machine, the first frame having a left side disposed to the left of the first shuttle and an opposite right side disposed to the right of the first shuttle;
a pair of master loading rails extending between the left side and the right side of the first frame;
a loading unit that is movably attached to the first frame and disposed above the first shuttle, the loading unit having a plurality of wheels associated with the pair of master loading rails, such that to allow the loading unit to move between the left side and the right side of the first frame and vice versa; and
an unloading unit having a motor, the unloading unit being movably attached to the first frame and disposed above the first shuttle;
a slave module comprising:
a second frame being adapted for selective positioning either to the left or to the right side of the master module; and
a pair of slave loading rails associated with the second frame and being aligned with the pair of master loading rails, such that to allow the loading unit to travel from the first frame to the second frame and vice versa;
a controller having:
a data connection to the first shuttle and to the master module;
wherein the controller is adapted to automatically recognize what type of system module is connected to the controller via a unique network identifier associated with said system module;
wherein, the loading unit of the master module is controlled by the controller to automatically travel from the master module to the slave module to retrieve a material sheet therefrom and place the material sheet onto the first shuttle.

2. The modular loading and unloading system from claim 1, further comprising an insert module disposed between the master module and the slave module and over a second shuttle that feeds material sheets into a second material sheet processing machine, the insert module having a pair of insert loading rails being aligned with the pair of master loading rails and with the pair of slave loading rails, such that to allow the loading unit to travel from the first frame to the second frame and vice versa, wherein, the loading unit is controlled by the controller to automatically travel from the master module to the slave module to retrieve the material sheet therefrom and place the material sheet onto the second shuttle, the modular loading and unloading system being thus configured to serve two shuttles.

3. The modular loading and unloading system from claim 2, further comprising a top tower that stores additional material sheets and being mounted atop the slave module, and, a crane having an elevator adapted to retrieve material sheets from the top tower and deliver said material sheets to the slave module.

4. The modular loading and unloading system from claim 3, wherein the elevator comprises a chain adapted to move in a first direction, such that a cam associated with the chain pushes in the first direction into a hook of a pallet on which the material sheets rest, thus pulling the pallet out of the top tower, onto the elevator.

5. The modular loading and unloading system from claim 4, wherein the chain is adapted to move in a second opposite direction, such that the cam pushes the hook of the pallet in the second opposite direction, thus pushing the pallet off the elevator, into the top tower.

6. The modular loading and unloading system from claim 1, further comprising a first top tower that stores additional material sheets and being mounted atop the slave module, and, a crane having an elevator adapted to retrieve material sheets from the first top tower and deliver said material sheets to the slave module.

7. The modular loading and unloading system from claim 6, further comprising a bottom tower module, a second top tower disposed atop the bottom tower module, a staging cart for storing material sheets and being adapted to roll into the bottom tower module, wherein the crane is disposed between a first storing assembly formed by the bottom tower module and the second top tower, and, a second storage assembly formed by the slave module and the first top tower, such that the crane can retrieve material sheets from all towers and deliver the material sheets to the slave module for access by the loading unit.

8. The modular loading and unloading system from claim 1, further comprising a staging cart for storing material sheets and being adapted to roll into the slave module, so that the material sheets are accessible to the loading unit.

9. The modular loading and unloading system from claim 1, further comprising a rear output station mounted adjacent to the first shuttle and receiving processed parts, and, a sorting robot controlled by the controller that sorts the processed parts from the rear output station.

10. The modular loading and unloading system from claim 1, wherein the unloading unit comprises a fork having teeth that slide open and close to retrieve processed parts from the first shuttle.

11. The modular loading and unloading system from claim 1 further comprising a top tower module being adapted to be positioned on top of the slave module and to store a plurality of material sheets.

12. A modular loading and unloading system comprising:
a master module, the master module comprising:
a first frame adapted for positioning over a shuttle that feeds material sheets into a material sheet processing machine, the first frame having a left side disposed to the left of the shuttle and an opposite right side disposed to the right of the shuttle;
a pair of master loading rails extending between the left side and the right side of the first frame;
a loading unit that is movably attached to the first frame and disposed above the shuttle, the loading unit having a plurality of wheels associated with the pair of master loading rails, such that to allow the loading unit to move between the left side and the right side of the first frame and vice versa; and
an unloading unit that is movably attached to the first frame and disposed above the loading unit when the unloading and the loading units are both in an initial position; and
a slave module comprising:
a second frame being adapted for selective positioning either to the left or to the right side of the master module; and
a pair of slave loading rails associated with the second frame and being aligned with the pair of master loading rails, such that to allow the loading unit to travel from the first frame to the second frame and vice versa;

wherein, the master module is adapted to perform concurrent loading and unloading operations by the loading unit being moved away, into the slave module to retrieve a material sheet therefrom, thus allowing the unloading element to concurrently approach the shuttle to collect processed parts from the shuttle.

13. The modular loading and unloading system from claim 12, wherein the loading unit comprises a plurality of suction cups that descend onto a stack of material sheets stored into the slave module and collect only one material sheet therefrom.

14. The modular loading and unloading system from claim 13, wherein the unloading unit comprises a fork having teeth that slide open and close to retrieve processed parts from the shuttle.

15. The modular loading and unloading system from claim 14, wherein, after the loading unit travels back to the first frame and the unloading unit concurrently retreats, such that the loading and unloading units are both in the initial position, the loading unit delivers said material sheet to the shuttle by disengaging the plurality of suction cups and the unloading unit delivers the processed parts atop the loading unit by opening the teeth of the fork.

16. A method of configuring and operating a modular loading and unloading system comprising a master module having a loading unit and an unloading unit, a slave module adapted to allow the loading unit to travel from the master module to the slave module and vice versa, and a controller, the method comprising:
  placing the master module over a shuttle and the slave module adjacent to the master module;
  expanding the modular loading and unloading system by connecting a new module of the system to the controller;
  automatically recognizing, by the controller, the type of the new module based on a unique network identifier associated with said new module;
  presenting to a user, via a GUI, the option to add the new module with default parameters associated with the new module;
  if the user selects not to add the new module with default parameters, presenting the user with the option to set, via the GUI, custom parameters associated with the new module;
  wherein the type of the new module is a crane having an elevator.

17. The method of claim 16, wherein the default parameters comprise the speed of the elevator and the custom parameters comprise the left or right positioning of the crane within the modular loading and unloading system.

* * * * *